United States Patent
Thomson et al.

(10) Patent No.: US 10,723,050 B2
(45) Date of Patent: Jul. 28, 2020

(54) METHOD OF MANUFACTURING A WINDOW SEAL ASSEMBLY WITH A MOLDED BRACKET

(71) Applicant: Henniges Automotive Sealing Systems North America, Inc., Wilmington, DE (US)

(72) Inventors: Matt Thomson, Reidsville, NC (US); Stephen J. Murree, Macomb, MI (US); Tom Groters, Waterford, MI (US); Robert Krueger, Grosse Ile, MI (US); Marko Josten, West Bloomfield, MI (US)

(73) Assignee: Henniges Automotive Sealing Systems North America, Inc., Dover, DE (US)

( * ) Notice: Subject to any disclaimer, the term of this patent is extended or adjusted under 35 U.S.C. 154(b) by 344 days.

(21) Appl. No.: 15/826,010

(22) Filed: Nov. 29, 2017

(65) Prior Publication Data
US 2019/0160716 A1   May 30, 2019

(51) Int. Cl.
*B29C 45/14* (2006.01)
*E06B 7/23* (2006.01)
(Continued)

(52) U.S. Cl.
CPC ...... *B29C 45/14467* (2013.01); *B29C 45/006* (2013.01); *B29C 45/14065* (2013.01);
(Continued)

(58) Field of Classification Search
None
See application file for complete search history.

(56) References Cited

U.S. PATENT DOCUMENTS

| 2,571,259 | A | 10/1951 | Kusiak |
| 2,579,072 | A | 12/1951 | Harris |
(Continued)

FOREIGN PATENT DOCUMENTS

| DE | 19543819 A1 | 8/1996 |
| DE | 10159251 C1 | 4/2003 |
(Continued)

OTHER PUBLICATIONS

English language abstract for FR2959785A1 extracted from espacenet.com database on Jul. 5, 2018, 2 pages.
(Continued)

*Primary Examiner* — Edmund H Lee
(74) *Attorney, Agent, or Firm* — Howard & Howard Attorneys PLLC

(57) ABSTRACT

A method of manufacturing a seal assembly for attachment to a vehicle having a securing point spaced from a vehicle point at a distance with an apparatus having first and second receptacles defining a cavity, and a bracket apparatus defining a bracket cavity, including: forming a first strip having a first body with first ends; forming a second strip having a second body with second ends; positioning one first end into the first receptacle with the first body adjacent to the bracket cavity; positioning one second end into the second receptacle; forming a molding bonding the strips together to define a mold point; forming a bracket with a receiver at a receiver point, and an interface bonded to the first body spaced such that a distance between the receiver point of the bonded bracket and the mold point is equal to the distance between the securing and vehicle points.

25 Claims, 22 Drawing Sheets

(51) Int. Cl.
  *B60J 10/00* (2016.01)
  *B29C 45/00* (2006.01)
  *B60R 13/06* (2006.01)
  *B29K 709/08* (2006.01)
  *B60J 10/30* (2016.01)
  *B29L 31/26* (2006.01)
  *B29K 23/00* (2006.01)
  *B60J 10/70* (2016.01)

(52) U.S. Cl.
  CPC .. *B29C 45/14336* (2013.01); *B29C 45/14377* (2013.01); *B29C 45/14778* (2013.01); *B60J 10/45* (2016.02); *B60R 13/06* (2013.01); *E06B 7/2301* (2013.01); *B29C 2045/0063* (2013.01); *B29C 2045/0067* (2013.01); *B29K 2023/065* (2013.01); *B29K 2023/12* (2013.01); *B29K 2709/08* (2013.01); *B29L 2031/26* (2013.01); *B60J 10/30* (2016.02); *B60J 10/70* (2016.02)

(56) References Cited

U.S. PATENT DOCUMENTS

| | | | |
|---|---|---|---|
| 2,637,073 | A | 5/1953 | Walther |
| 4,834,931 | A | 5/1989 | Weaver |
| 4,861,540 | A | 8/1989 | Nieboer et al. |
| 5,092,078 | A | 3/1992 | Keys |
| 5,139,307 | A * | 8/1992 | Koops ............... B60J 10/78 296/201 |
| 5,155,938 | A | 10/1992 | Nozaki |
| 5,433,038 | A | 7/1995 | Dupuy |
| 5,451,090 | A | 9/1995 | Brodie et al. |
| 5,505,602 | A | 4/1996 | Sumi |
| 5,702,148 | A | 12/1997 | Vaughan et al. |
| 5,779,956 | A | 7/1998 | Hollingshead et al. |
| 5,846,463 | A * | 12/1998 | Keeney ............. B29C 45/14467 264/135 |
| 6,802,666 | B1 | 10/2004 | Bormann et al. |
| 7,010,886 | B2 | 3/2006 | Deguchi et al. |
| 7,114,221 | B2 | 10/2006 | Gibbons et al. |
| 7,320,199 | B2 * | 1/2008 | Ueda ............... B60J 10/21 49/479.1 |
| 7,350,849 | B2 | 4/2008 | Roush et al. |
| 7,425,032 | B2 | 9/2008 | Morikawa et al. |
| 7,837,257 | B2 | 11/2010 | Kuntze et al. |
| 8,127,501 | B2 | 3/2012 | Nakao et al. |
| 8,371,069 | B2 | 2/2013 | O'Sullivan et al. |
| 8,414,063 | B2 | 4/2013 | Watson et al. |
| 8,561,353 | B2 | 10/2013 | Terai et al. |
| 8,640,385 | B2 | 2/2014 | Sawatani et al. |
| 8,667,738 | B2 | 3/2014 | Kondo et al. |
| 8,801,070 | B2 | 8/2014 | Takeuchi et al. |
| 9,022,446 | B2 | 5/2015 | Zimmer et al. |
| 9,085,219 | B2 | 7/2015 | Wade et al. |
| 9,114,765 | B1 | 8/2015 | James et al. |
| 9,234,540 | B2 | 1/2016 | Bachelder et al. |
| 9,290,083 | B2 | 3/2016 | Mass et al. |
| 9,614,705 | B2 | 4/2017 | Jeng et al. |
| 9,783,134 | B2 | 10/2017 | Mori et al. |
| 9,809,097 | B1 | 11/2017 | Metcalf et al. |
| 9,834,071 | B2 | 12/2017 | Alhof |
| 2004/0031203 | A1 | 2/2004 | Russell et al. |
| 2004/0161584 | A1 | 8/2004 | Aritake et al. |
| 2004/0250474 | A1 | 12/2004 | Kubo et al. |
| 2005/0229495 | A1 | 10/2005 | Murase et al. |
| 2005/0269741 | A1 * | 12/2005 | Rigby ............... B29C 45/1671 264/261 |
| 2006/0073727 | A1 * | 4/2006 | Kimura ............. B29C 45/14409 439/441 |
| 2006/0107601 | A1 | 5/2006 | Inagaki et al. |
| 2007/0175102 | A1 | 8/2007 | Teramoto et al. |
| 2007/0194539 | A1 | 8/2007 | Titz et al. |
| 2008/0182046 | A1 | 7/2008 | Brambrink et al. |
| 2008/0238134 | A1 | 10/2008 | Guellec |
| 2012/0144751 | A1 | 6/2012 | Schapitz |
| 2013/0341961 | A1 | 12/2013 | Mori et al. |
| 2014/0059940 | A1 | 3/2014 | Eguchi |
| 2015/0165880 | A1 | 6/2015 | Mass et al. |
| 2016/0075062 | A1 | 3/2016 | DeVlieger |
| 2016/0076164 | A1 | 3/2016 | DeVlieger |
| 2017/0008567 | A1 | 1/2017 | Kim |
| 2018/0001748 | A1 | 1/2018 | Kramar et al. |
| 2018/0065284 | A1 | 3/2018 | Sutter |
| 2019/0061214 | A1 | 2/2019 | Groters |
| 2019/0160716 | A1 | 5/2019 | Thomson et al. |

FOREIGN PATENT DOCUMENTS

| | | |
|---|---|---|
| DE | 102010001468 A1 | 8/2011 |
| DE | 102015210901 A1 | 12/2016 |
| EP | 1642696 A1 | 4/2006 |
| EP | 3093115 A1 | 11/2016 |
| EP | 3093116 A1 | 11/2016 |
| FR | 2959785 A1 | 11/2011 |
| JP | H06156157 A | 6/1994 |
| JP | H0872100 A | 3/1996 |
| JP | 2013116679 A | 6/2013 |
| JP | 6065798 B2 | 1/2017 |
| WO | 2016040761 A1 | 3/2016 |
| WO | 2016040845 A1 | 3/2016 |
| WO | 2017075025 A1 | 5/2017 |
| WO | 2017075028 A1 | 5/2017 |
| WO | 2017132382 A1 | 8/2017 |

OTHER PUBLICATIONS

English language abstract for JP2013116679A extracted from espacenet.com database on Jul. 5, 2018, 1 page.
English language abstract for JP6065798B2 extracted from espacenet.com database on Jul. 5, 2018, 1 page.
English language abstract for JPH08-72100 extracted from espacenet.com database on Jun. 5, 2019, 2 pages.
European Search Report for Application EP 17 74 4895 dated May 21, 2019, 3 pages.
International Search Report for Application No. PCT/US2016/058826 dated Jan. 3, 2017, 1 page.
International Search Report for Application No. PCT/US2026/058820 dated Jan. 23, 2017, 1 page.
International Search Report for Application No. PCT/US2017/015137 dated Apr. 4, 2017, 1 page.
U.S. Appl. No. 62/246,375, filed Oct. 26, 2015, 15 pages.
U.S. Appl. No. 62/246,382, filed Oct. 26, 2015, 20 pages.
U.S. Appl. No. 62/287,163, filed Jan. 26, 2016, 14 pages.
English language abstract for DE19543819A1 extracted from espacenet.com database on Apr. 19, 2018, 1 page.
English language abstract for DE10159251C1 extracted from espacenet.com database on Apr. 19, 2018, 1 page.
English language abstract for DE102010001468A1 extracted from espacenet.com database on Apr. 19, 2018, 2 pages.
Computer generated English language abstract for DE102015210901A1 extracted from espacenet.com database on Apr. 19, 2018, 2 pages.
English language abstract for EP3093115A1 extracted from espacenet.com database on Apr. 19, 2018, 2 pages.
Computer-generated English language abstract for EP3093116 extracted from espacenet.com database on Apr. 19, 2018, 3 pages.
English language abstract for JPH06156157A extracted from espacenet.com database on Apr. 18, 2018, 1 page.
European Search Report for Application EP 16 86 0667 dated Mar. 11, 2019, 2 pages.

* cited by examiner

METHOD OF MANUFACTURING A WINDOW SEAL ASSEMBLY WITH A MOLDED BRACKET

TECHNICAL FIELD

The present invention relates, generally, to seal assemblies and, more specifically, to a method of manufacturing a window seal assembly.

BACKGROUND

Conventional seal assemblies are used in a number of different industries to provide a seal between different components which may be movable relative to one another. By way of non-limiting example, seal assemblies such as weatherstrips, weatherseals, glassrun moldings, window seals, and the like are used in the automotive industry to seal between a vehicle door defining a window opening, and a glass panel supported for sliding movement relative to the door to selectively close the window opening. These conventional seal assemblies may be operatively attached to different portions of the vehicle in a number of different ways, such as with fasteners, clips, and the like.

Those having ordinary skill in the art will appreciate that seal assemblies may be manufactured in a number of different ways to suit specific vehicle application requirements. To this end, conventional seal assemblies are formed from one or more extruded members which are molded together, such as with a plastic injection process, which bonds the extruded members together at a predetermined location corresponding to a portion of the vehicle, such as at a corner of the window opening, to form a molded seal assembly. In order to facilitate attachment to the vehicle, various types of clips, locators, and/or brackets are often subsequently attached to the molded seal assembly at predetermined locations which correspond to fastening locations of the particular vehicle. To this end, holes or other formations may be defined in one or more of the extruded members prior to molding, and clips, fasteners, locators, and the like may be subsequently installed into the holes/formations after the molded seal assembly has been formed.

While methods of manufacturing seal assemblies known in the related art have generally performed well for their intended purpose, there remains a need in the art for improved methods of manufacturing.

SUMMARY OF THE INVENTION

The present invention includes a method of manufacturing a window seal assembly for attachment to a vehicle having a securing point and defining a vehicle reference point spaced from the securing point at a predetermined distance. The method utilizes a molding apparatus having a first receptacle and a second receptacle and defining a molding cavity, and a bracket apparatus defining a bracket cavity. The method includes the steps of: forming a first strip of material to define a first body extending between opposing first strip ends; forming a second strip of material to define a second body extending between opposing second strip ends; positioning one of the first strip ends of the first strip into the first receptacle with a portion of the first body engaging the bracket apparatus adjacent to the bracket cavity; positioning one of the second strip ends of the second strip into the second receptacle; directing material into the molding cavity to form a molding bonding the first strip together with the second strip, with the molding defining a molding reference point; and directing material into the bracket cavity to form a bracket having a flange with a receiver defining a receiver point and having an interface extending from the flange into contact with the first body to bond the bracket to the first body at a location along the first strip spaced from the molding reference point such that a distance between the receiver point of the bonded bracket and the molding reference point is equal to the predetermined distance between the securing point and the vehicle reference point.

In this way, the method of the present invention affords advantages for manufacturing seal assemblies.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION

Figure 1:
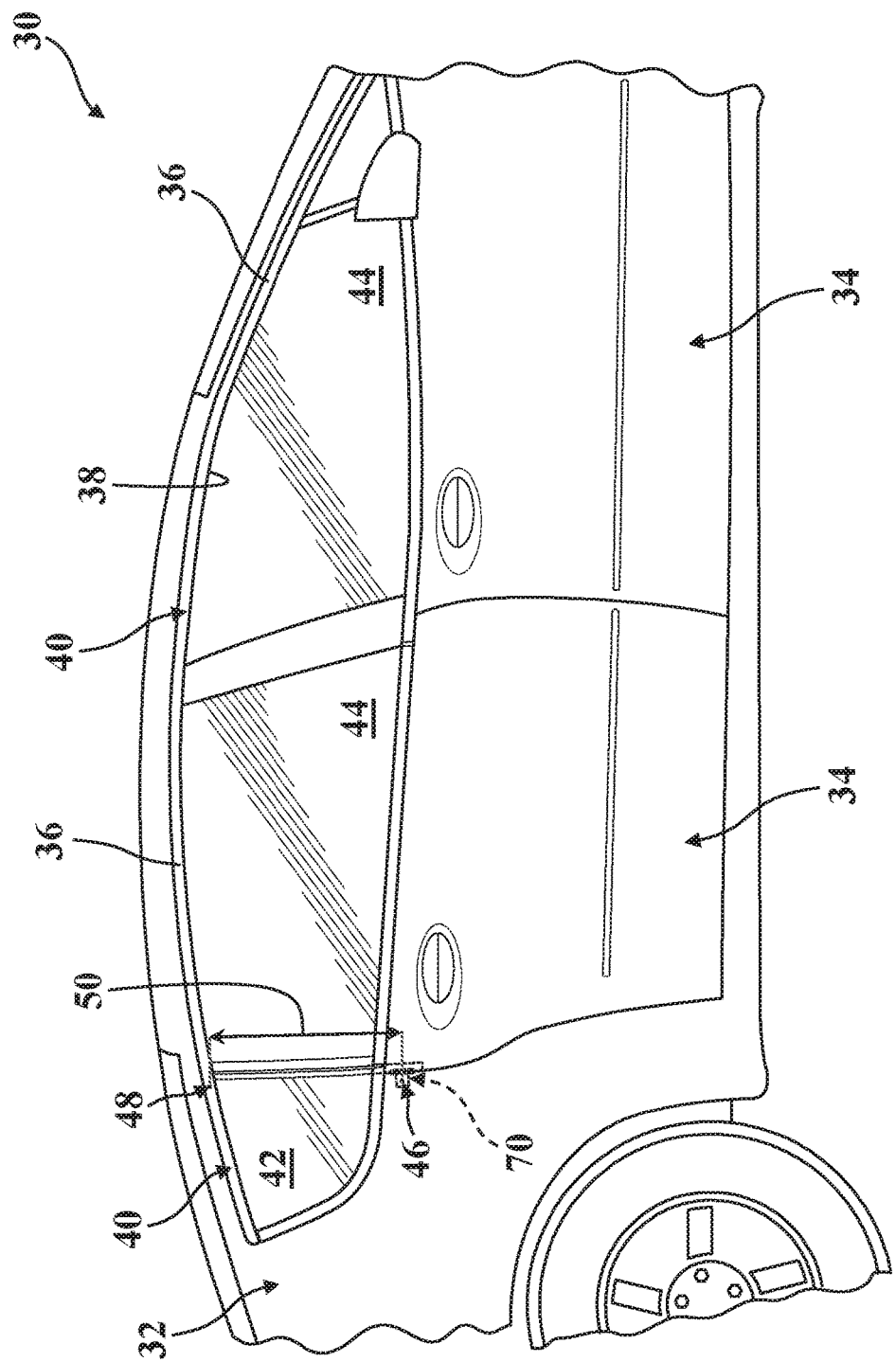
FIG. 1 is a partial side view of a vehicle including a window seal assembly according to one embodiment of the present invention.

Referring now to the drawings, wherein like numerals indicate corresponding parts throughout the several views, a portion of an automotive passenger vehicle is shown at 30 in FIG. 1. The vehicle 30 has a body, generally indicated at 32, and a plurality of doors 34 coupled to the body 32. Each of the doors 34 has a window frame 36 defining a window 38, and a seal assembly 40 adjacent to the window frame 36. In the representative embodiments illustrated herein and depicted throughout the drawings, the seal assembly 40 is realized as a window seal assembly 40 which is coupled to and extends along at least a portion of the window frame 36 and also supports an encapsulated glass window 42, as described in greater detail below. However, those having ordinary skill in the art will appreciate that the seal assembly 40 could be realized in a number of different ways, for different vehicle 30 applications or for different types of vehicles 30, without departing from the scope of the present invention. Moreover, while the present invention is adapted for use with automotive passenger vehicles, it will be appreciated that the seal assembly 40 could be used in connection with any type of vehicle, such as heavy-duty trucks, trains, airplanes, ships, construction vehicles or equipment, military vehicles, or any other type of vehicle that utilizes seal assemblies 40.

With continued reference to FIG. 1, each of the doors 34 also includes a window closure member 44 (such as a glass window pane) movable between open and closed positions with respect to the window frame 36 and at least partially received within the window seal assembly 40 when the window closure member 44 is in the closed position (not shown in detail, but generally known in the art). Furthermore, the vehicle 30 also has a securing point, generally indicated at 46, and the vehicle 30 defines a vehicle reference point, generally indicated at 48, which is spaced from the securing point 46 at a predetermined distance 50. As is explained in greater detail below, the securing point 46 and the vehicle reference point 48 of the vehicle 30 correspond, respectively, to a receiver point 52 and a molding reference point 54 of the window seal assembly 40 which are spaced from each other at a distance 56 which is equal to the predetermined distance 50 between the securing point 46 and the vehicle reference point 48 of the vehicle 30. The securing point 46, the vehicle reference point 48, the receiver point 52, and the molding reference point 54 will each be described in greater detail below.

Figure 2:
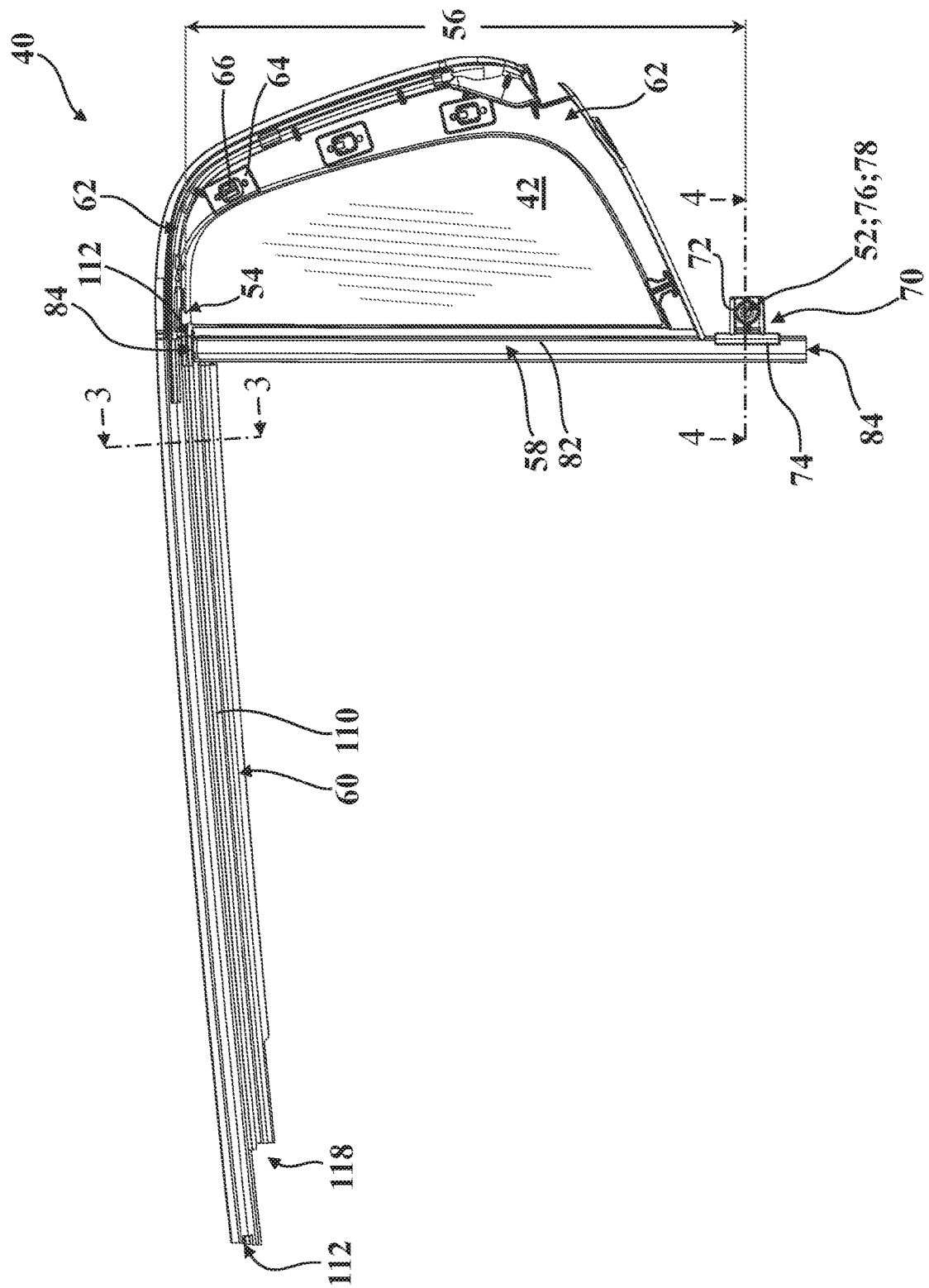
FIG. 2 is a front-side plan view of the window seal assembly of FIG. 1, shown having a bracket bonded to a first body of the window seal assembly.
Figure 6:
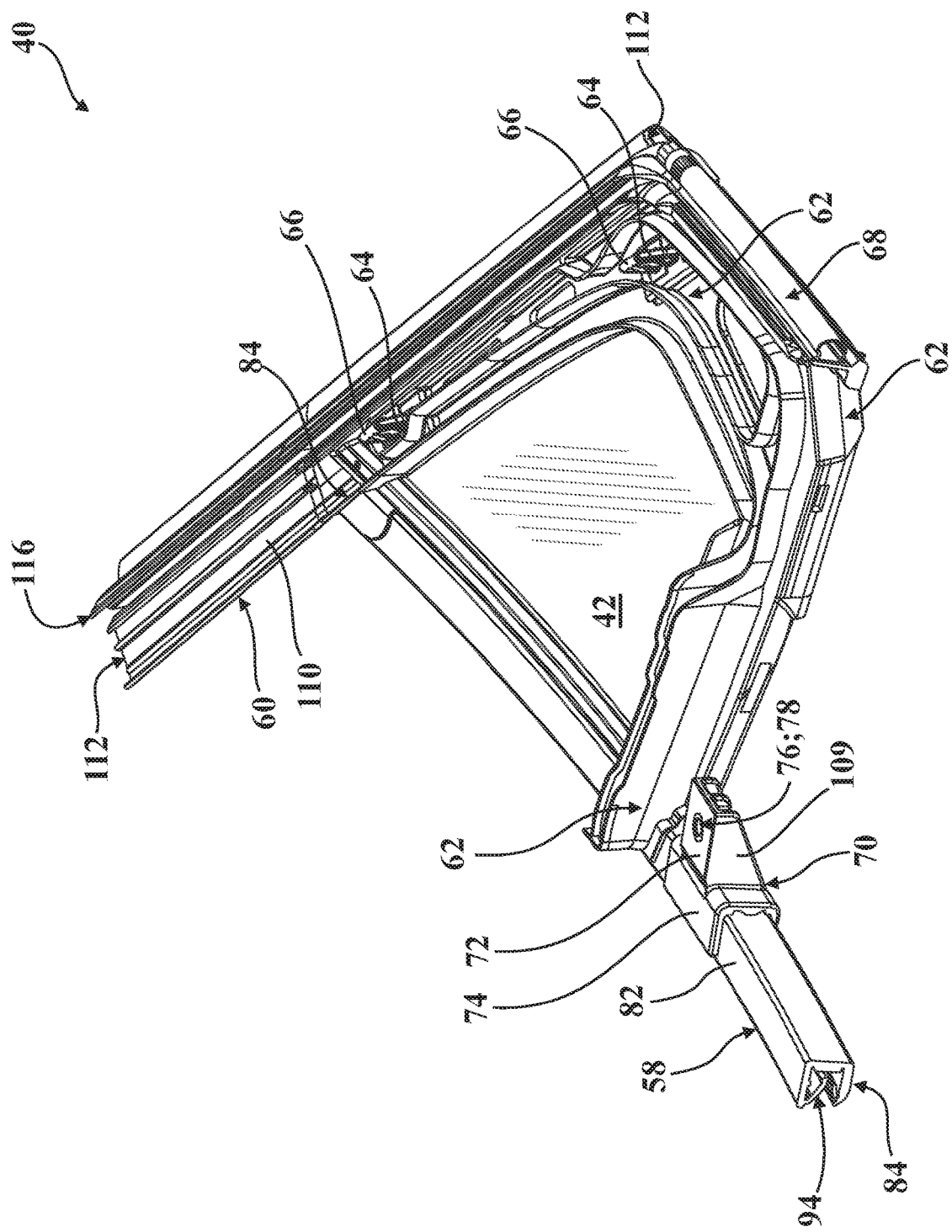
FIG. 6 is a perspective view of another embodiment of a window seal assembly, shown with a molding bonding first and second bodies bonded together with an encapsulated glass window, and shown with a bracket bonded to the first body.

Referring now to FIGS. 2 and 6, two embodiments of the window seal assembly 40 are shown, each including a first strip 58 and a second strip 60 operatively attached to the first strip 58, as described in greater detail below. In the representative embodiments illustrated herein, the strips 58, 60 each have a generally curved profile and seal against the window closure member 44 in the closed position (not shown in detail, but generally known in the art). However, those having ordinary skill in the art will appreciate that the window seal assembly 40 could have any suitable profile, shape, or configuration sufficient to effect receiving the window closure member 44 in the closed position without departing from the scope of the present invention.

In the illustrated embodiments, the first strip 58 is operatively attached to both the second strip 60 as well as to the glass window 42 via a molding 62 which bonds the strips 58, 60 together. Specifically, the molding 62 of the window seal assembly 40 couples the first strip 58 and the second strip 60 together in a predetermined orientation that is complimentary to the shape and orientation of the window frame 36 of the vehicle 30, as described in greater detail below.

In addition to bonding the strips 58, 60 together, in the illustrated embodiments of the window seal assembly 40 depicted throughout the drawings, the molding 62 also encapsulates the glass window 42 and bonds to one or more locators 64 used to help position, align, or otherwise attach the window seal assembly 40 to the window frame 36 of the vehicle 30, such as via spring clips 66 attached to the locators 64 (see FIG. 6). The molding 62 defines the molding reference point 54 noted above, and is formed as is described in greater detail below. The molding 62 may also bond to other components, such as a bulb strip 68 employed to compress against vehicle 30 trim pieces (not shown, but generally known in the related art). However, those having ordinary skill in the art will appreciate that the window seal assembly 40 could comprise a number of different arrangements of components beyond those illustrated in FIGS. 2 and 6, and could be of different shapes and configurations to suit particular vehicle 30 applications and, thus, could employ additional strips and/or moldings without departing from the scope of the present invention. Furthermore, while the illustrated embodiments of the molding 62 encapsulate the glass window 42, it will be appreciated that the window seal assembly 40 could be provided with a molding 62 which bonds the first and second strips 58, 60 together without also bonding to other components. Other configurations are contemplated.

The window seal assembly 40 further includes a bracket 70 having a flange 72 and an interface 74 extending from the flange 72, which are formed as described in greater detail below. The flange 72 of the bracket 70 comprises a receiver 76 which defines the receiver point 52. As will be appreciated from the subsequent description of the bracket 70 below, the receiver 76 may be of different configurations to suit particular vehicle 30 applications. By way example, in the embodiment of the bracket 70 illustrated in FIGS. 5A, 18A, and 19A, the receiver 76 of the flange 72 is formed around a fastener insert 78 arranged at the receiver point 52

(see also FIGS. 2, 4, 6, and 15-16). However, in the embodiment of the bracket 70 illustrated in FIGS. 5B, 18B, and 19B, the receiver 76 of the flange 72 is defined by an aperture 80 formed extending through the flange 72 at the receiver point 52. Other configurations of the bracket 50, beyond those illustrated in the drawings, are contemplated.

Figure 5A:
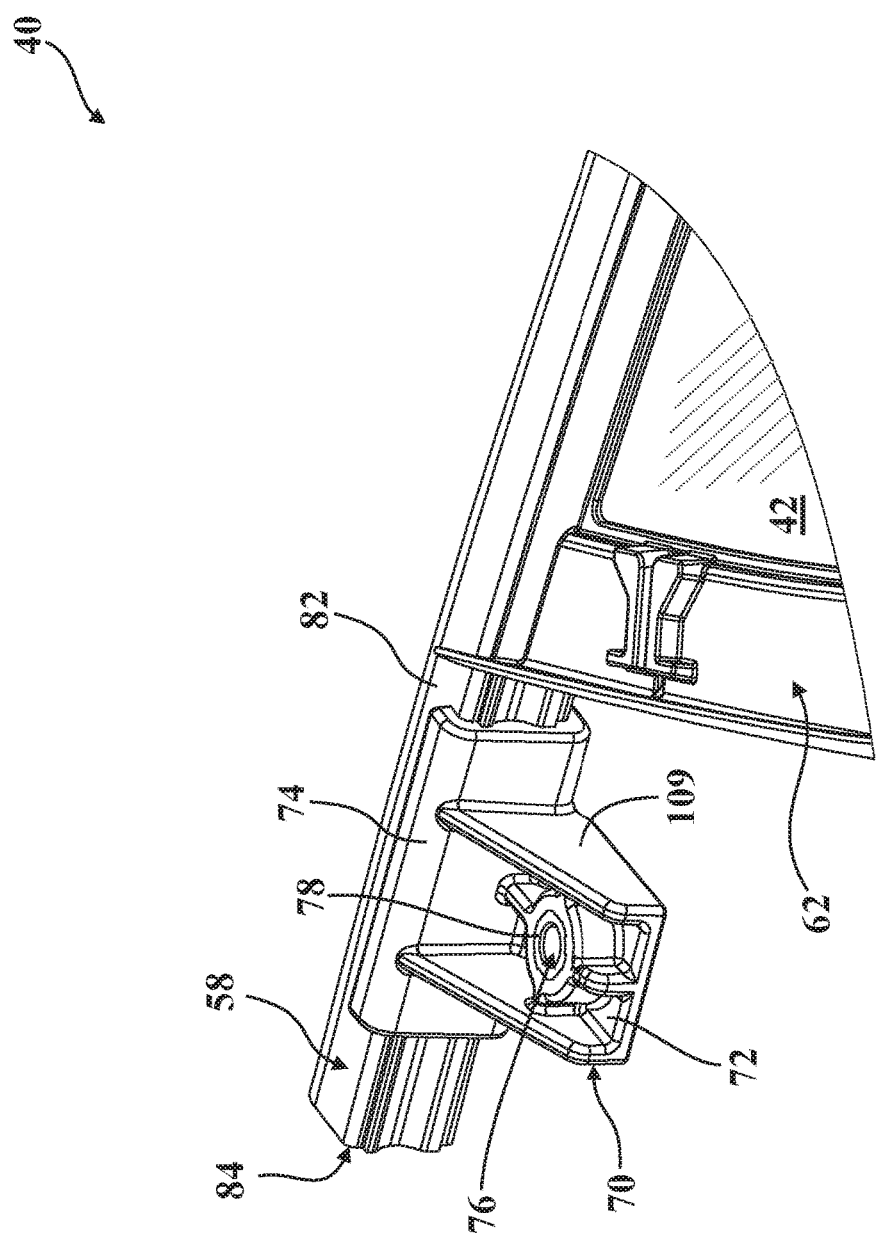
FIG. 5A is a partial perspective view of the window seal assembly of FIGS. 2-4, showing one embodiment of the bracket bonded to the first body.
Figure 5B:
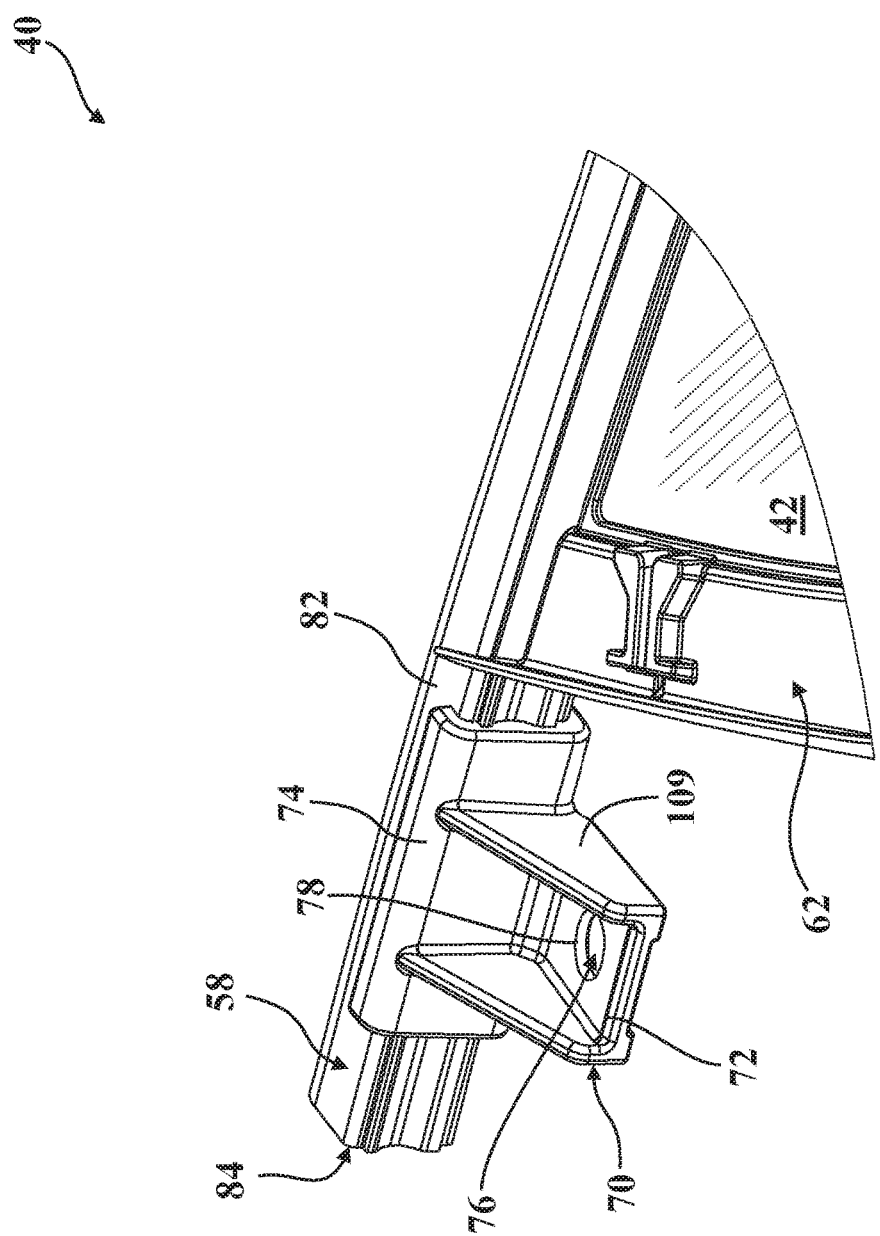
FIG. 5B is a partial perspective view of the window seal assembly of FIGS. 2-4, showing another embodiment of the bracket bonded to the first body.
Figure 18A:
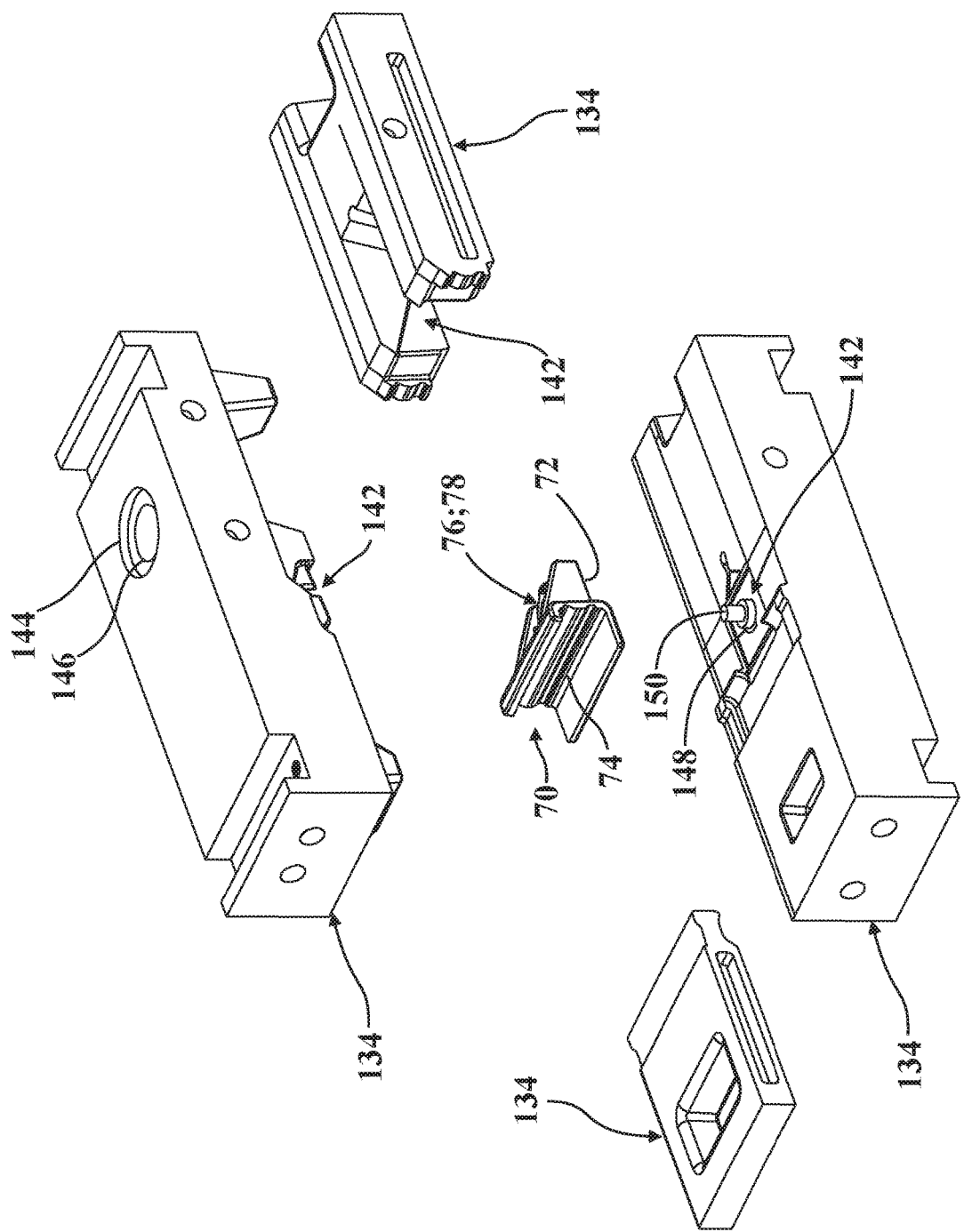
FIG. 18A is an exploded perspective view of the bracket apparatus of FIG. 17.
Figure 18B:
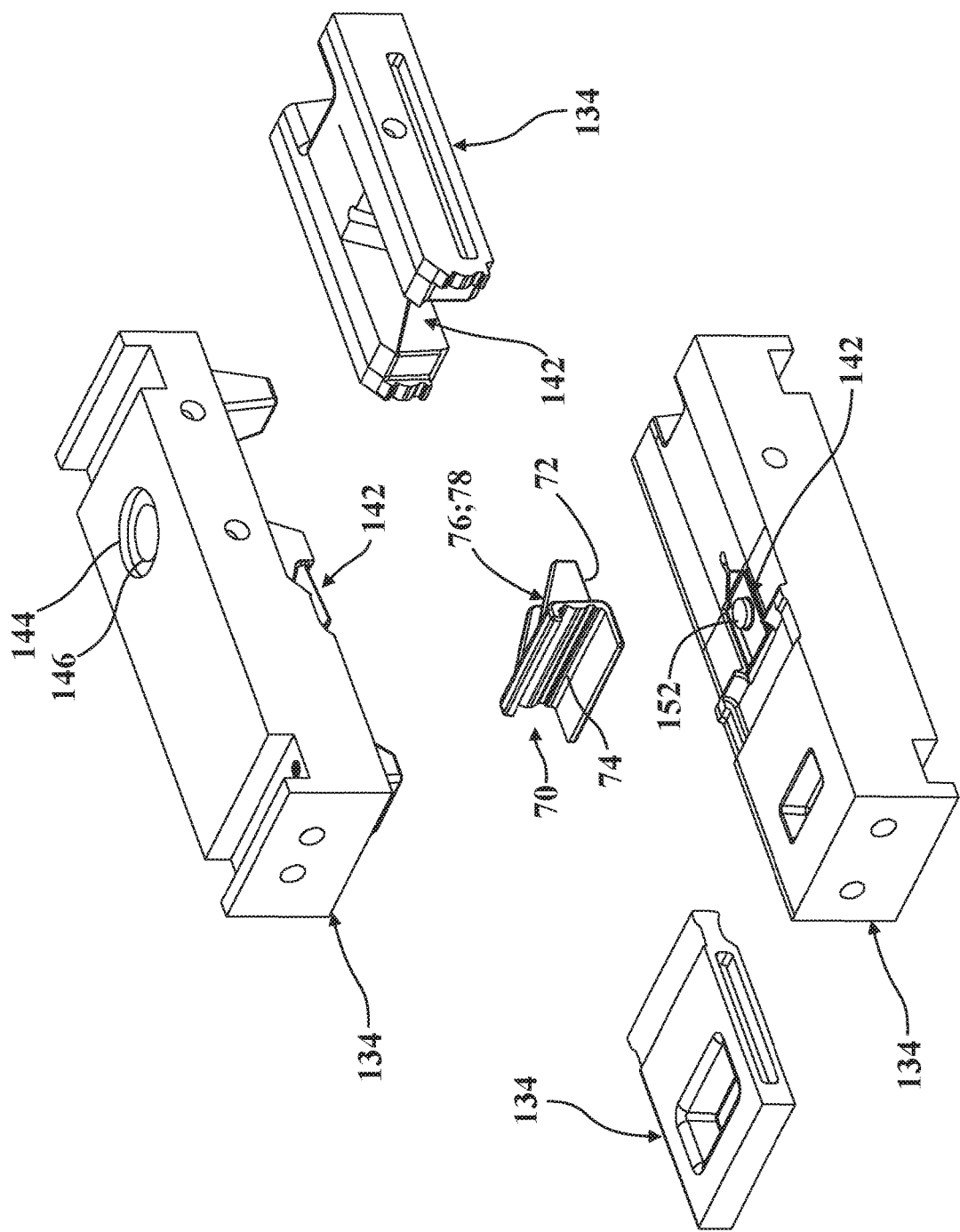
FIG. 18B is an exploded perspective view of another embodiment of a bracket apparatus to form the embodiment of the bracket of FIG. 5B.
Figure 19A:
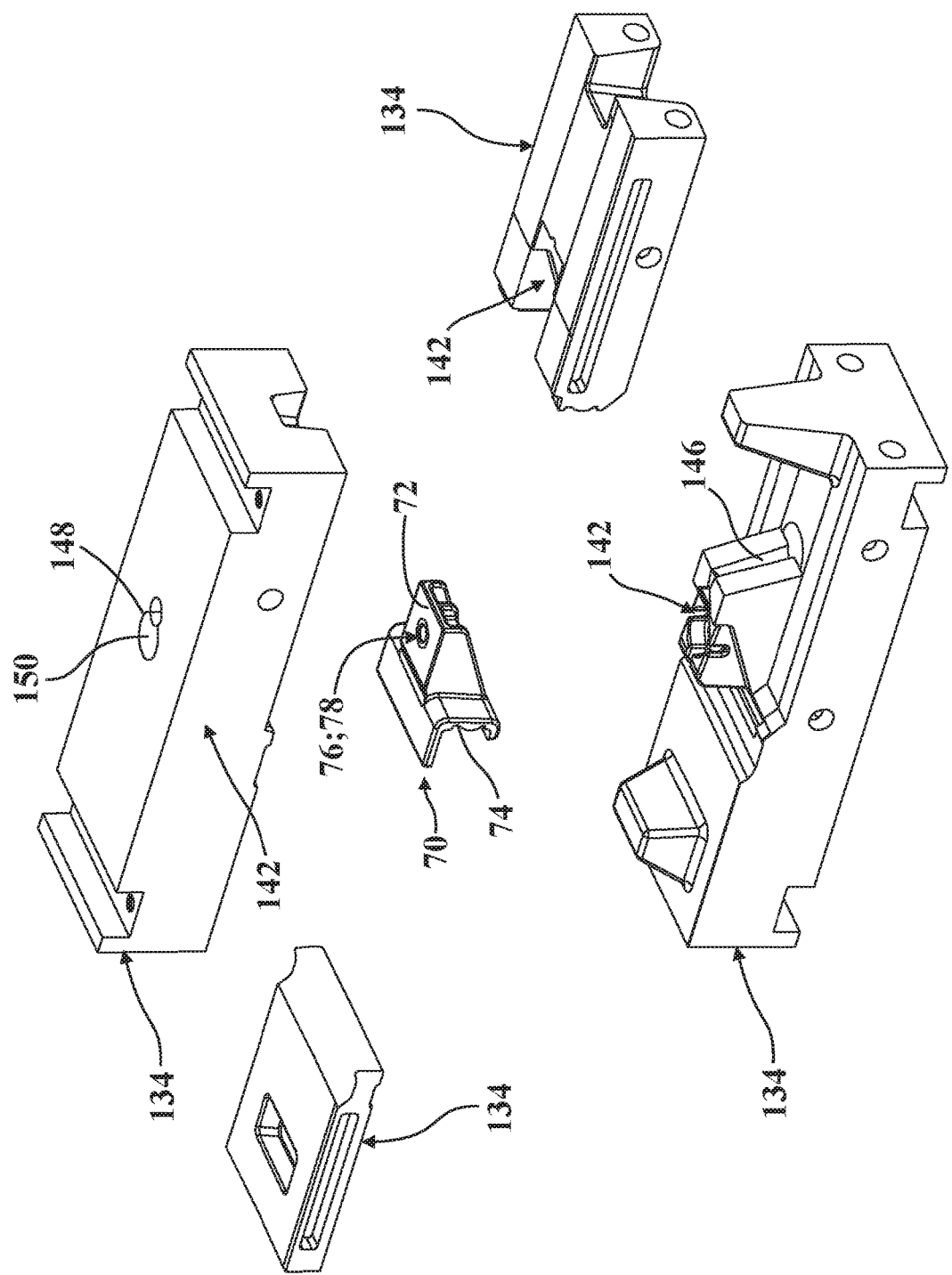
FIG. 19A is another exploded perspective view of the bracket apparatus of FIG. 18A.
Figure 19B:
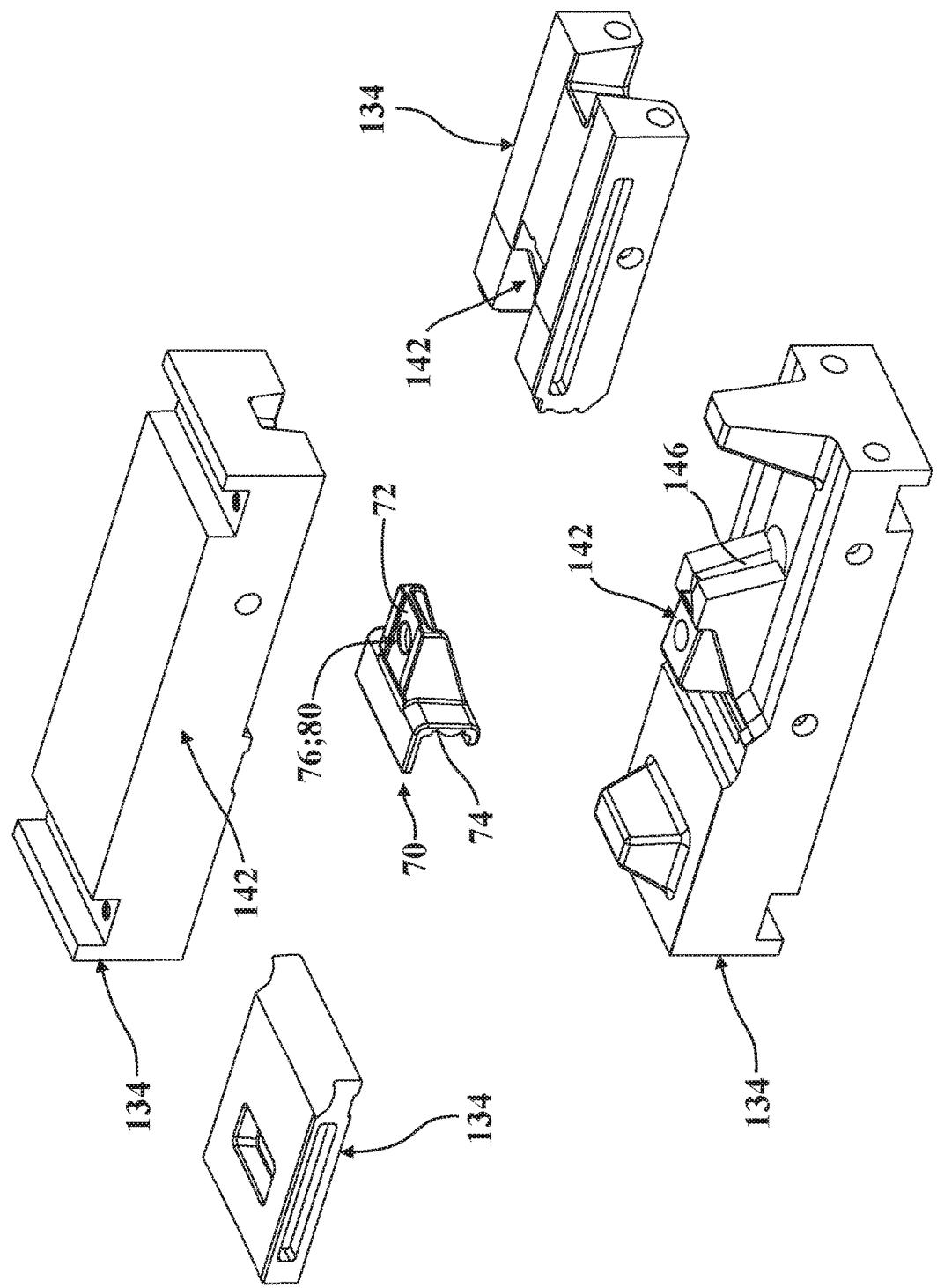
FIG. 19B is another exploded perspective view of the bracket apparatus of FIG. 18B.

The bracket 70 is operatively attached to the window seal assembly 40 and is configured to facilitate rigidly securing the window seal assembly 40 to the vehicle 30 via fasteners, such as a bolt which passes through a hole formed in the vehicle 30 adjacent to the window frame 36 to secure in threaded engagement with the fastener insert 78 in the embodiment illustrated in FIGS. 5A, 18A, and 19A, or with a threaded panel clip secured to the flange 72 adjacent the aperture 80 in the embodiment illustrated in FIGS. 5B, 18B, and 19B (bolt, hole, and threaded panel clip not shown, but generally known in the related art). Here, it will be appreciated that the rigid securing of the window seal assembly 40 via the bracket 70 affords advantages in applications where the window seal assembly 40 is relatively large (e.g., spans multiple vehicle 30 windows 38) and/or heavy (e.g., supports one or more encapsulated glass windows 42), or in applications where additional retention rigidity is required beyond the retention afforded by locators 64 and spring clips 66.

As is described in greater detail below, the bracket 70 is formed and bonded to the first strip 58 so that the receiver point 52 defined by the receiver 76 is spaced from the molding reference point 54 such that the distance 56 between the receiver point 52 and the molding reference point 54 is equal to the predetermined distance 50 between the securing point 46 and the vehicle reference point 48 of the vehicle 30 (see FIG. 2).

Figure 4:
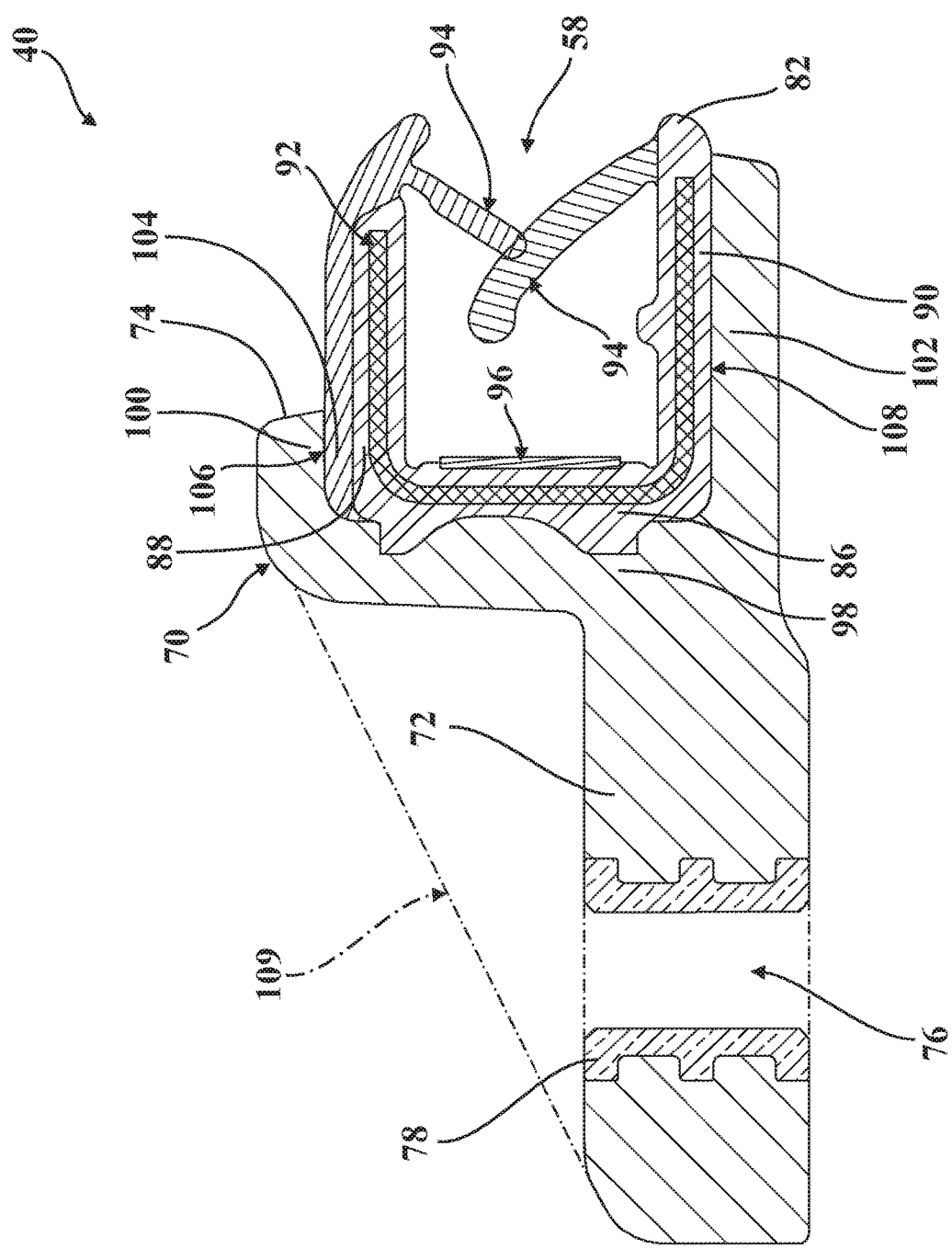
FIG. 4 is a slice section view taken along line 4-4 in FIG. 2, with certain profile lines included in phantom for illustrative purposes.

Referring now to FIG. 4, in the representative embodiment illustrated herein, the flange 72 and the interface 74 of the bracket 70 are formed integrally. The interface 74 is operatively attached to the first strip 58 during formation of the bracket 70, as described in greater detail below, and the receiver 76 is configured to facilitate rigidly attaching the window seal assembly 40 to the vehicle 30 as noted above. It will be appreciated that this configuration allows the window seal assembly 40 to be positioned within and rigidly secured to the window frame 36 so as to ensure a proper seal against the window closure member 44, the window frame 36, the door 34, and/or the body 32 of the vehicle 30.

Referring now to FIGS. 2 and 4-6, The first strip 58 has a first body, generally indicated at 82, which is formed such as via extrusion process, and which extends between opposing first strip ends 84 (see FIG. 2). In one embodiment, the first body 82 of the first strip 58 has a generally U-shaped profile extending between the first strip ends 84 defined by a base 86 and first and second arms 88, 90 extending from the base 86 (see FIG. 4). In the illustrated embodiments, the first body 82 also supports a first carrier 92 therein, which similarly has a generally U-shaped profile (see FIG. 4). The first carrier 86 may be manufactured from metal, such as steel, or from any other suitable material, and may have other profiles (e.g., rectangular), without departing from the scope of the present invention. In the illustrated embodiments, the first body 82 of the first strip 58 is realized as a "division bar" and includes a plurality of fingers, generally indicated at 94, and a contact member 96, which are each arranged to engage portions of the window closure member 44 as the window closure member 44 moves between open and closed positions with respect to the window frame 36 (positions not shown, but generally known in the related art).

As shown in FIG. 4, the interface 74 of the bracket 70 is formed so as to contact at least a portion of at least one of the first and second arms 88, 90 of the first body 82. To this end, the representative embodiment of the bracket 70 includes a base portion 98, a first portion 100, and a second portion 102. As is described in greater detail below, the bracket 70 is formed via an injection process, and the base portion 98 is formed to contact the base 86 of the first body 82, the first portion 100 is formed to contact the first arm 88 of the first body 82, and the second portion 102 is formed to contact the second arm 90 of the first body 82. In the illustrated embodiment, one of the fingers 94 of the first body 82 defines an arm portion 104 of the first arm 88 which is disposed in contact with the first portion 100 of the interface 74 of the bracket 70 across a first area 106. The second arm 90 of the first body 82 is directly disposed in contact with the second portion 102 of the interface 74 of the bracket 70 across a second area 108 larger than the first area 106. However, it will be appreciated that the first portion 100 of the interface 74 of the bracket 70 could directly contact the first arm 88 of the first body 82 in some embodiments, such as where the arm portion 104 is omitted from the first body 82 (not shown).

As shown in FIGS. 4-6, the base portion 98 of the interface 74 is arranged generally perpendicular to the flange 72, and the bracket 70 comprises one or more ribs 109 extending between the flange 72 and the interface 74. The ribs 109 are generally triangular and afford rigidity between the flange 72 and the interface 74, which is advantageous in applications where the receiver 76 is spaced from the first body 82 at relatively large distances.

Figure 3:
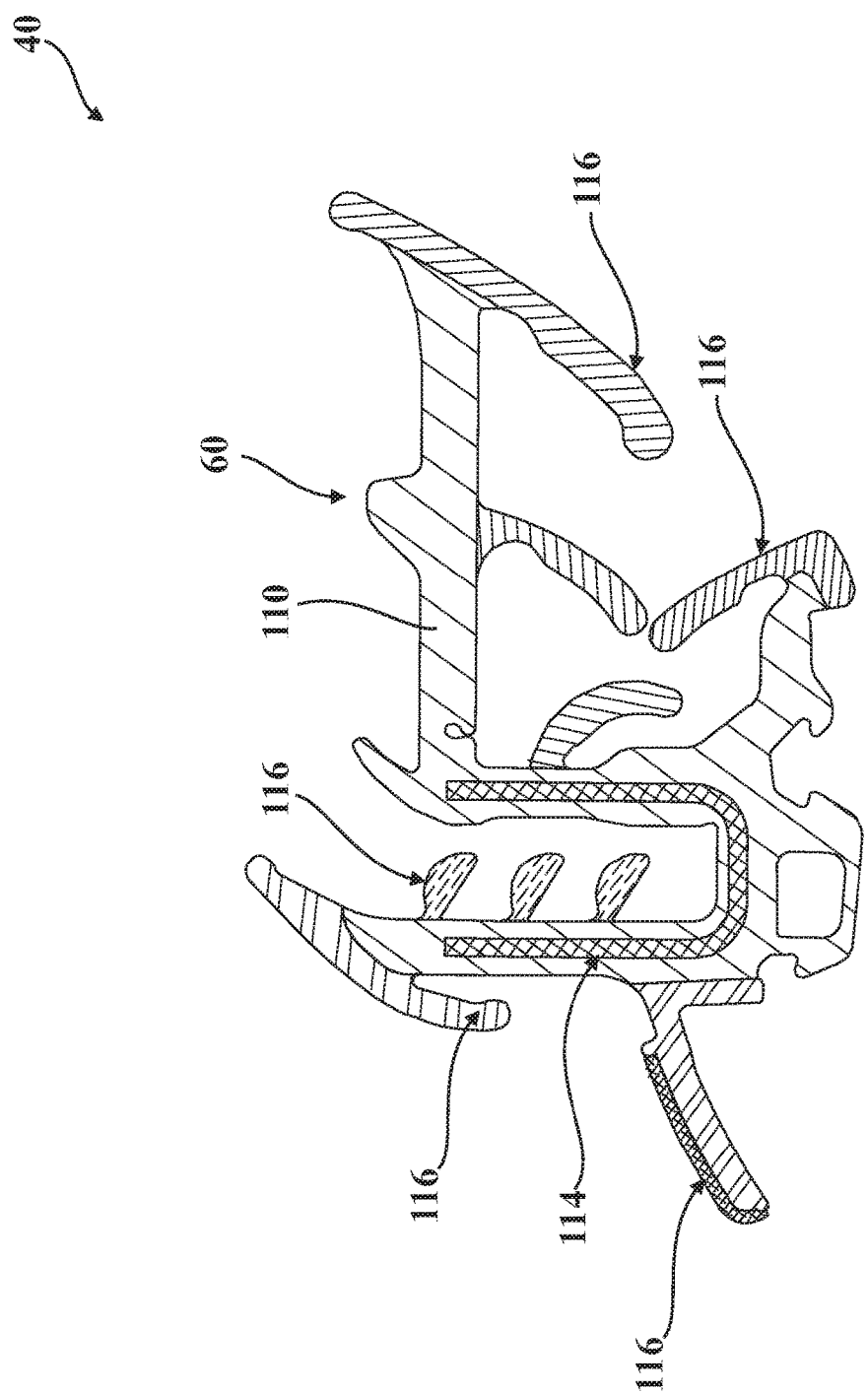
FIG. 3 is a slice section view taken along line 3-3 in FIG. 2

Referring now to FIGS. 2-3 and 6, the second strip 60 has a second body, generally indicated at 110, which is likewise formed such as via an extrusion process, and which extends between opposing second strip ends 112 (see FIG. 2). As is best shown in FIG. 3, the second body 110 of the second strip 60 supports a second carrier 114 therein. Here too, the second carrier 114 has a generally U-shaped profile and may similarly be manufactured from various types of metal with different profiles. In the representative embodiment illustrated herein, the second body 110 further includes a plurality of lips, generally indicated at 116 for abutting or otherwise engaging specific portions of the body 32 of the vehicle 30, the door 34, the window frame 36, and/or the window closure member 44 (not shown in detail, but generally known in the art).

It will be appreciated that the first body 82, the fingers 94, and/or the contact member 96 the first strip 58, as well as the second body 110 and/or the lips 116 of the second strip 60, could be manufactured from any suitable material or combination of materials, and could be formed in any suitable way, without departing from the scope of the present invention. By way of non-limiting example, one or more portions of the first strip 58 and/or the second strip 60 could be manufactured via a plastic extrusion process utilizing one or more predetermined materials, such as from one or more types of EPDM (Ethylene Propylene Diene Monomer) rubber and/or TPV (ThermoPlastic Vulcanized) rubber.

As noted above, ensuring proper orientation of the various components of the window seal assembly 40 during manufacturing ensures proper alignment of the window seal assembly 40 within the window frame 36 of the vehicle 30. Specifically, in the representative embodiment illustrated herein, the predetermined distance 50 between the securing point 46 and the vehicle reference point 48 of the vehicle 30 (see FIG. 1) needs to be maintained with respect to the distance 56 between the receiver point 52 and the molding reference point 54 of the window seal assembly 40 (see FIG. 2) so as to rigidly secure the window seal assembly 40 to the vehicle 30 and thereby ensure proper fitment, alignment, and operation of the window seal assembly 40 in use. As will be appreciated from the subsequent description below, slight dimensional variations of the individual components of the window seal assembly 40, along with manufacturing process variations, can cause a so-called "tolerance stack-up" during manufacturing which, in turn, can complicate maintaining the distance 56 within acceptable tolerance ranges.

In certain embodiments, one or more of the first strip ends 84 of the first strip 58 and/or the second strip ends 112 of the second strip 60 may be "notched" to receive or otherwise align with one or more components of the window seal assembly 40 prior to formation of the molding 62, as described in greater detail below. By way of illustrative example, as shown in FIG. 2, the first strip 58 may be provided with an end notch, generally indicated at 188, having a stepped profile that helps facilitate alignment and/or engagement with other moldings, strips, parts of the vehicle 30, and the like.

In the representative embodiment depicted herein, the bracket 70 formed in-place such as via a molding process (by way of non-limiting example, via injection molding) from a thermoplastic such as Polypropylene (PP) or High-Density PolyEthylene (HD-PE) such that once formed, the bracket 70 is bonded to the first strip 58. However, those having ordinary skill in the art will appreciate that the bracket 70 could be formed from any suitable material sufficient to bond to the first strip 58 and to facilitate proper alignment of the window seal assembly 40, as described above, without departing from the scope of the present invention.

Figure 7:
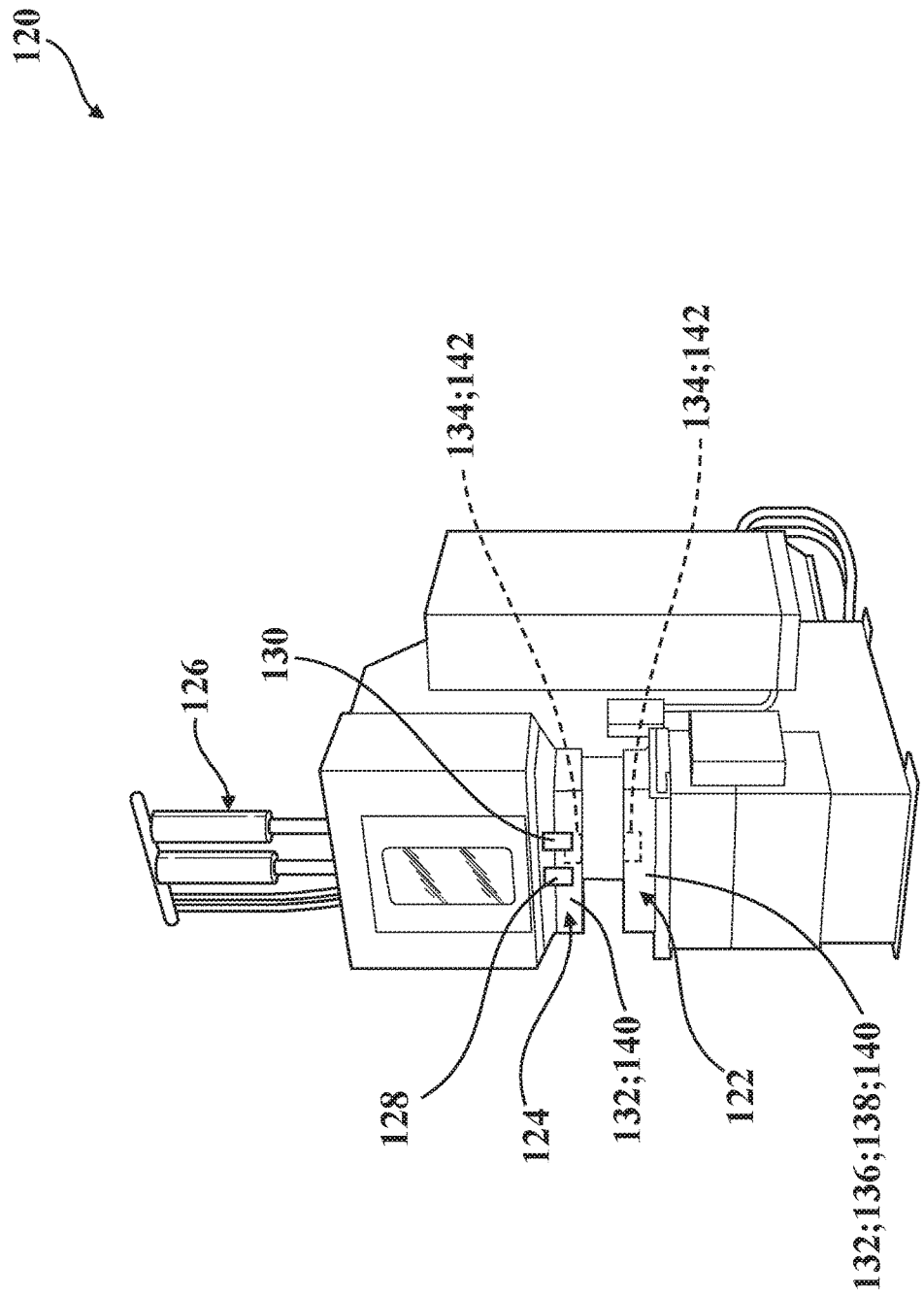
FIG. 7 is a perspective view of a molding system for use in manufacturing the window seal assembly of FIG. 6.
Figure 8:
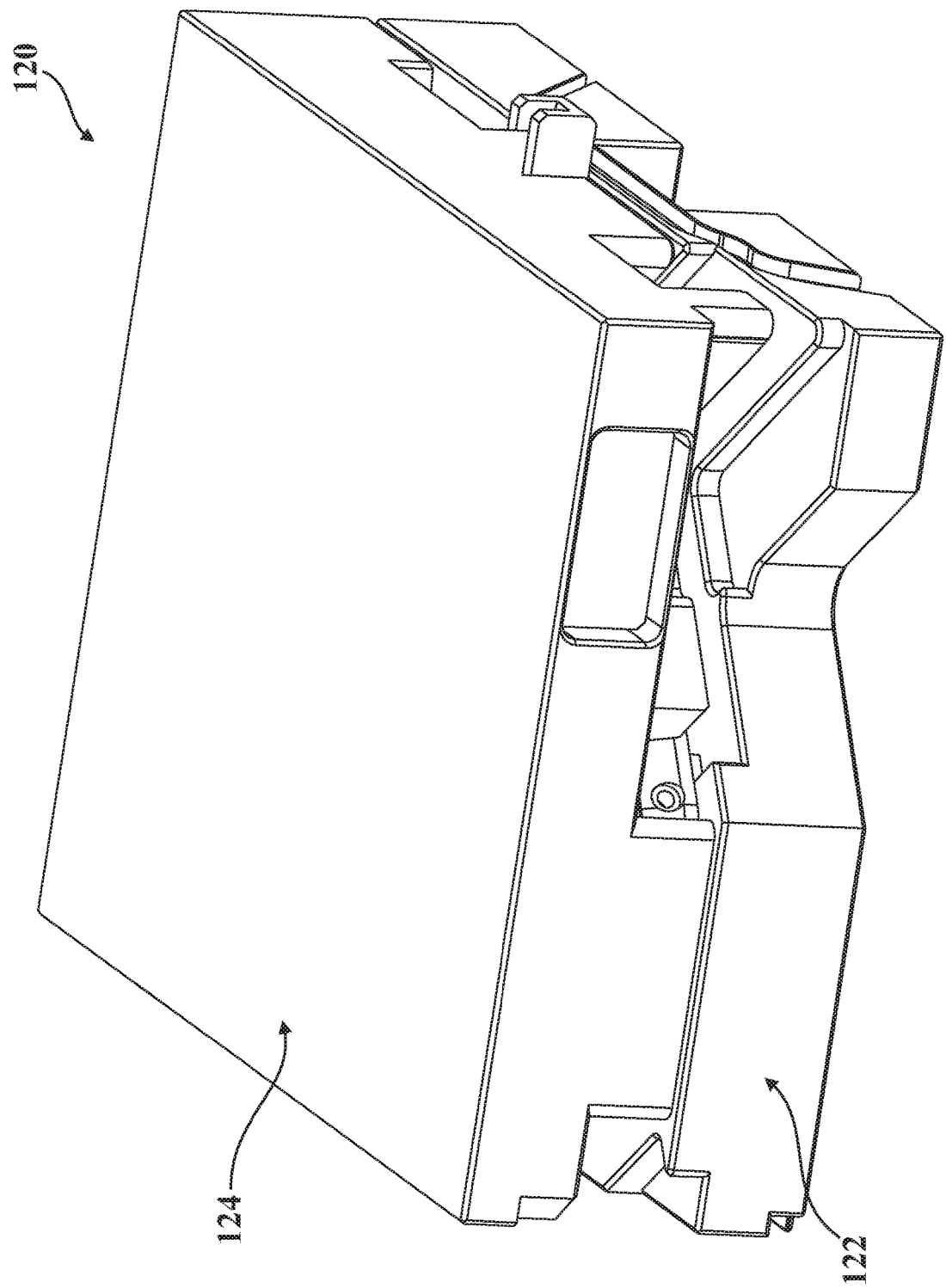
FIG. 8 is a perspective view of a molding apparatus for use with the molding system of FIG. 7 that is adapted to form the molding of the window seal assembly of FIG. 6, the molding apparatus shown having first and second mold subassemblies arranged in a closed orientation.
Figure 9:
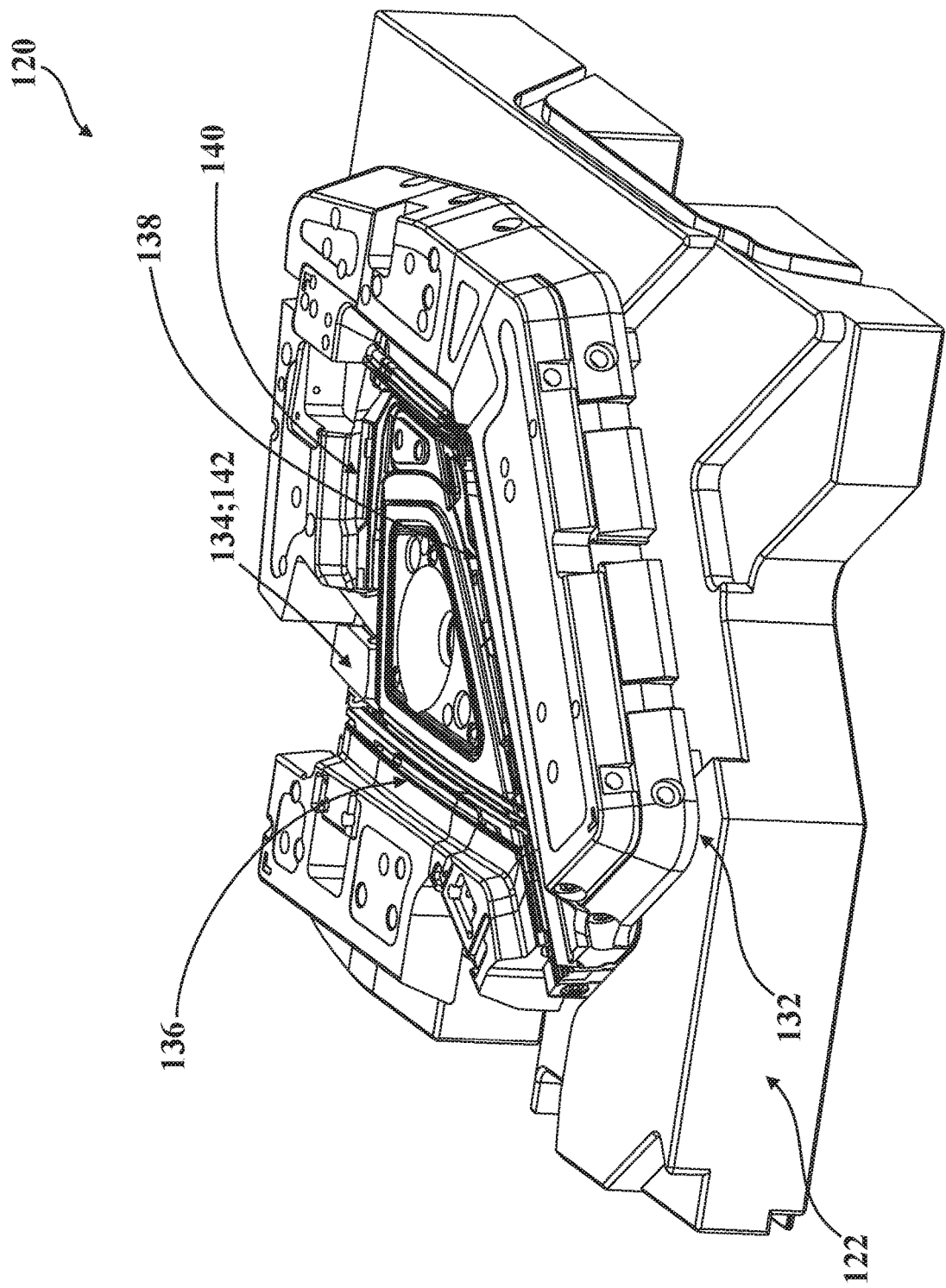
FIG. 9 is a perspective view of the first mold subassembly of the molding apparatus of FIG. 8, shown having a first receptacle, a second receptacle, a molding cavity, and a portion of a bracket apparatus adapted to form the bracket of the window seal assembly of FIG. 6.
Figure 10:
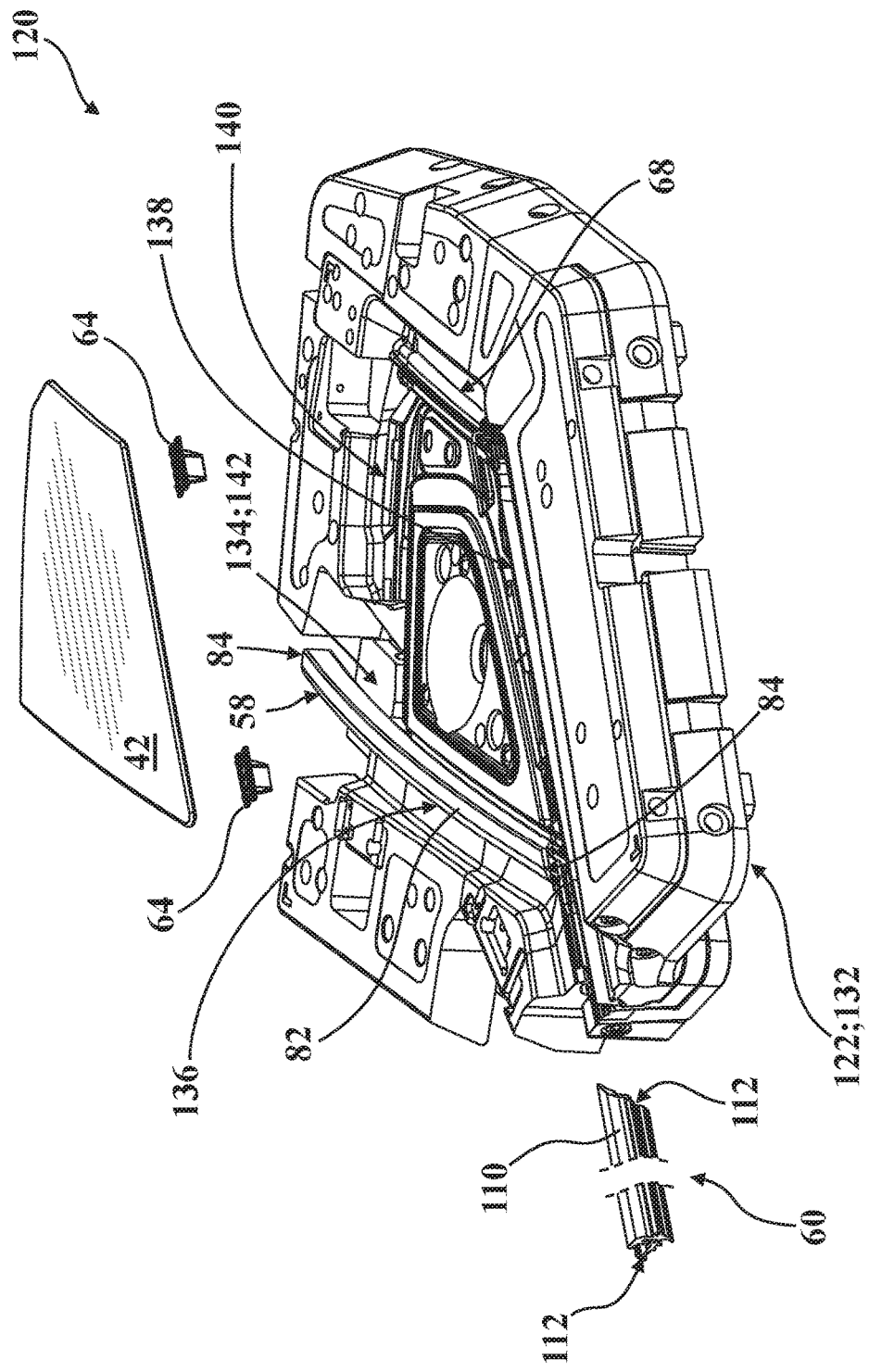
FIG. 10 is a partial perspective view of the first mold subassembly of FIGS. 8-9, shown with the first body of the window seal assembly disposed in the first receptacle, with a second body of the window seal assembly positioned adjacent to the second receptacle, and shown with a pair of preformed clip mounts and a glass window spaced above the molding cavity.

Referring now to FIG. 7, a molding system for forming the window seal assembly 40 is depicted generically at 120. The molding system 120 generally includes a first mold subassembly 122 and a second mold subassembly 124. Here, the first mold subassembly 122 is generally configured to support the various components which cooperate to subsequently define the formed window seal assembly 40, as described in greater detail below, and the second mold subassembly 124 is generally configured to engage against the first mold subassembly 122 via force from one or more rams, generally indicated at 126, and employs a first injector 128 to form the molding 62 and a second injector 130 to form the bracket 70. Those having ordinary skill in the art will appreciate that the molding system 120, including the first mold subassembly 122, the second mold subassembly 124, the rams 126, and/or the injectors 128, 130, could be configured or otherwise implemented in a number of different ways without departing from the scope of the present invention.

Referring now to the embodiment depicted in FIGS. 7-11, the molding system 120 generally includes a molding apparatus 132 and a bracket apparatus 134. Here, the molding apparatus 132 has a first receptacle 136 and a second receptacle 138, and defines a molding cavity 140. The bracket apparatus 134, in turn, has or otherwise defines a bracket cavity 142 which is arranged outside of the molding cavity 140 and which is shaped to form the bracket 70 and to bond the bracket 70 to the first body 82 of the first strip 58, as described in greater detail below. In the representative embodiment of the molding system 120 illustrated in FIGS. 7-11, the bracket apparatus 134 is formed separately from and is mounted to the molding apparatus 132 such that the bracket cavity 142 is outside of the molding cavity 140.

Figure 13:
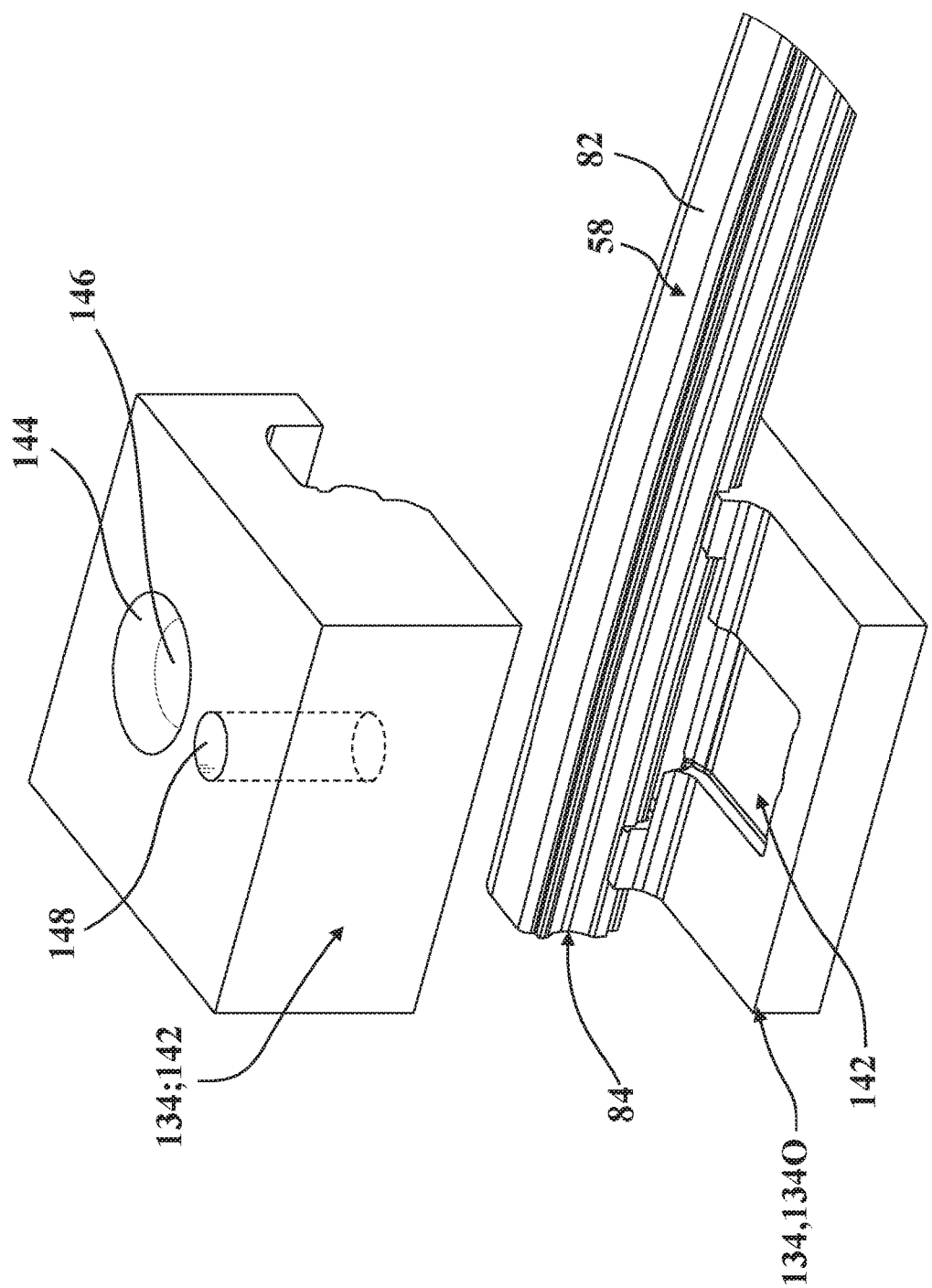
FIG. 13 is a partial perspective view of a portion of the first body of the window seal assembly of FIG. 6 supported in a generically-illustrated bracket apparatus shown arranged in an opened orientation.
Figure 14:
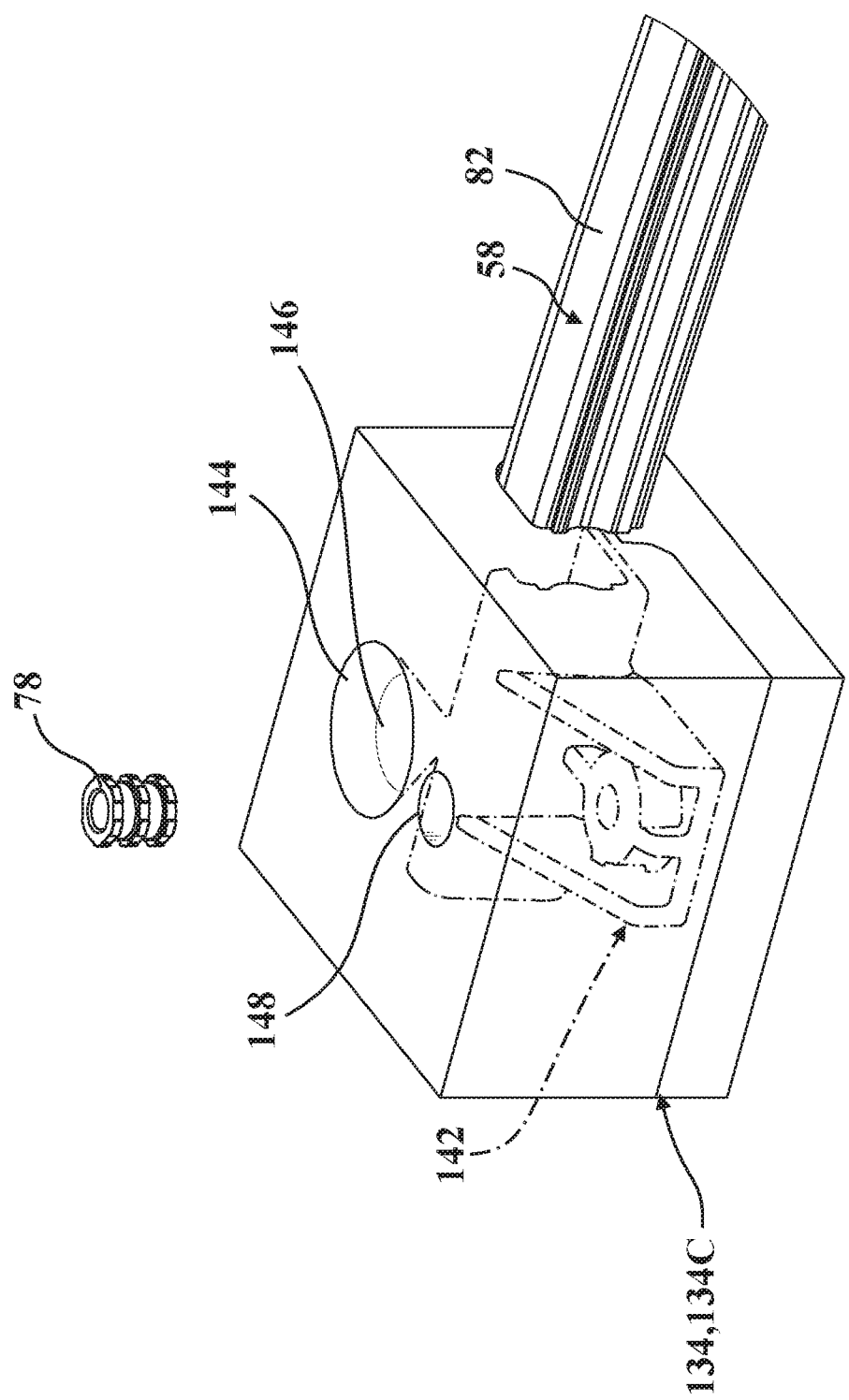
FIG. 14 is another partial perspective view of the first body and the generically-illustrated bracket apparatus of FIG. 13, shown with the bracket apparatus arranged in a closed orientation, and shown with a fastener insert spaced above a bracket cavity defined by the bracket apparatus.
Figure 15:
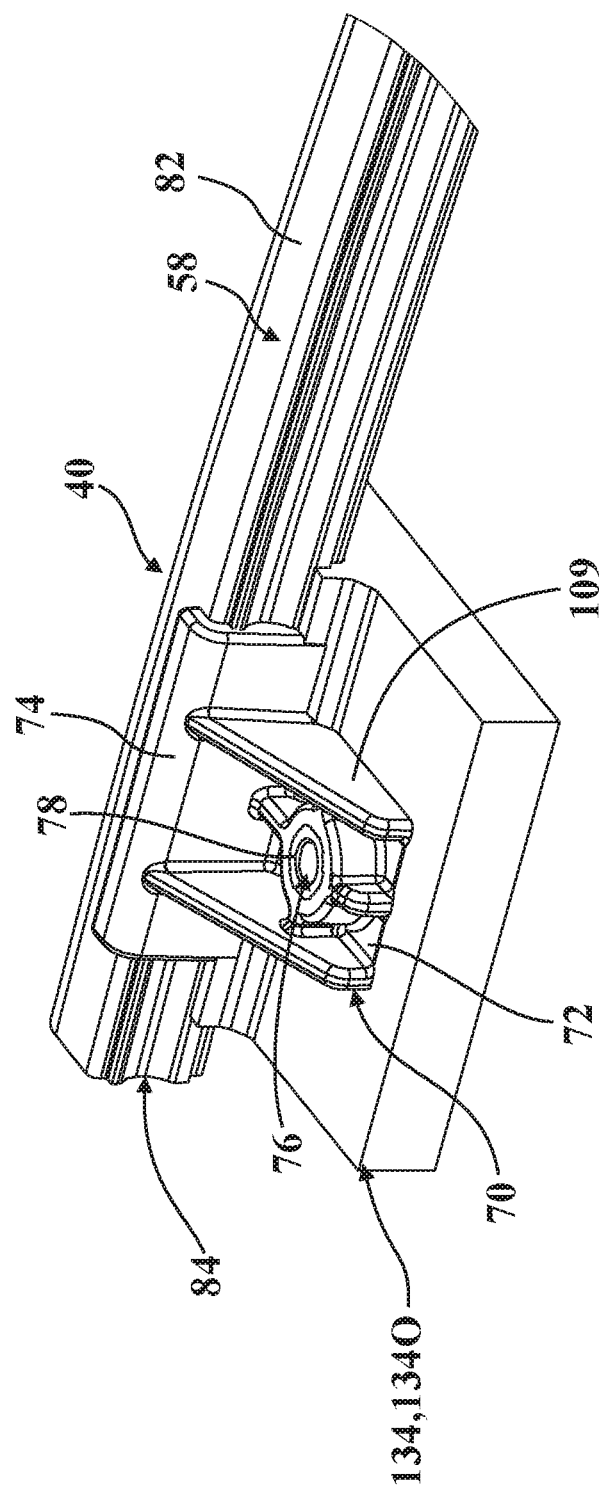
FIG. 15 is another partial perspective view of the first body and a portion of the generically-illustrated bracket apparatus of FIGS. 13-14, shown with a bracket formed in the bracket cavity bonding the first body to the fastener insert.
Figure 16:
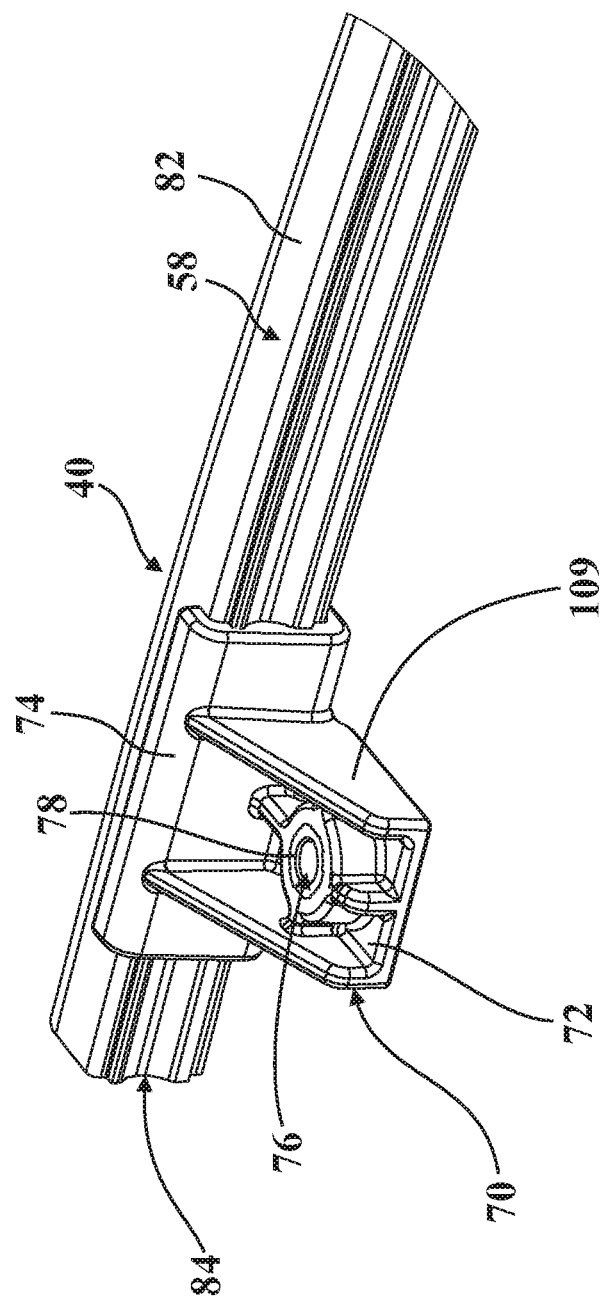
FIG. 16 is a partial perspective view of the first body, the bracket, and the fastener insert of FIG. 15.
Figure 17:
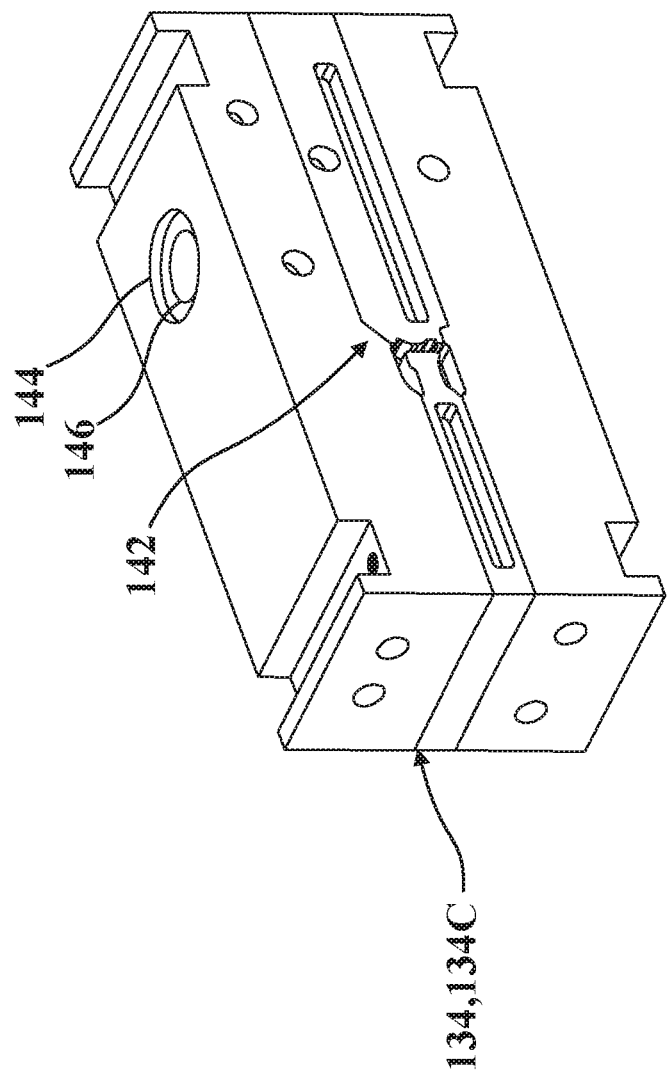
FIG. 17 is a perspective view of one embodiment of a bracket apparatus adapted to form the embodiment of the bracket shown in FIGS. 5A, 6, and 16.

The bracket apparatus 134, depicted generically in FIGS. 13-15, is movable between a closed orientation 134C (see FIG. 14; see also FIG. 17) and an opened orientation 134O (see FIG. 13; see also FIGS. 18A-19B), such as via one or more actuators (not shown, but generally known in the related art). In some embodiments, such as those illustrated in FIGS. 18A-19B, portions of the bracket apparatus 134 (as well as the molding apparatus 132) are generally movable with respect to each other, such as with one or more actuators (not shown, but generally known in the related art), which may be implemented to position the window seal assembly 40 advantageously for removal after the molding 62 and the bracket 70 have been formed (sequentially compare FIGS. 13-16).

Referring now to FIGS. 7-19B, as noted above, the bracket 70 is formed in the bracket cavity 142 of the bracket apparatus 134. As is shown best in FIG. 14, the bracket cavity 142 is shaped so as to correspond to the shape of the bracket 70, in particular so as to simultaneously form the flange 72 and the interface 74. To this end, the bracket cavity 142 is disposed in communication with an injection port 144 via a channel 146 defined between the bracket cavity 142 and the injection port 144. Here, the injection port 144 is arranged so as to engage the second injector 130 (see FIG. 7) which, in turn, directs material into the injection port 144 which then flows to the bracket cavity 142 via the channel 146 so as to fill the bracket cavity 142 to form the bracket 70. Here, the material directed into the bracket cavity 142 engages and binds to the first body 82 of the first strip 58, thereby also forming the interface 74 of the bracket 70.

As is depicted generically in FIGS. 13-14, in embodiments where the bracket 70 is provided with the fastener insert 78 in the flange 72 to define the receiver 76, a portion of the bracket apparatus 134 may comprise an insert port, generally indicated at 148, to facilitate positioning the fastener insert 78 prior to directing material into the bracket cavity 142 to form the bracket 70. In the embodiment illustrated in FIGS. 18A and 19A, the insert port 148 is arranged to receive a stud 150 onto which the fastener insert 78 can be supported, positioned within the bracket cavity 142. As is depicted in FIGS. 18B and 19B, in embodiments where the bracket 70 is provided with the aperture 80 in the flange 72 to define the receiver 76, a portion of the bracket apparatus 134 may comprise a mold plug body 152 around which the flange 72 is formed to define the aperture 80. It will be appreciated that the bracket apparatus 134 and/or the molding apparatus 132 could be configured and/or arranged in a number of different ways sufficient to form the bracket 70 and the molding 62 without departing from the scope of the present invention.

As noted above, the present invention is directed towards a method of manufacturing the window seal assembly 40 described above by utilizing molding systems 120 of the types described herein and depicted throughout the drawings. Here, the method includes the steps of forming the first strip 58 of material to define the first body 82 extending between the opposing first strip ends 84, and forming the second strip 60 of material to define the second body 110 extending between the opposing second strip ends 112. The method also includes the steps of positioning one of the first strip ends 84 into the first receptacle 136 with a portion of the first body 82 engaging the bracket apparatus 134 adjacent to the bracket cavity 142 (see FIG. 10; compare with FIG. 9), and positioning one of the second strip ends 112 of the second strip 60 into the second receptacle 138 (see FIG. 11; compare with FIG. 10). The method further includes the step of directing material into the molding cavity 140 to form the molding 62 bonding the first strip 58 together with the second strip 60, the molding 62 defining the molding reference point 54. The method also includes the step of directing material into the bracket cavity 142 to form the bracket 70 having the flange 72 with the receiver 76 defining the receiver point 52 and having the interface 74 extending from the flange 72 into contact with the first body 82 to bond the bracket 70 to the first body 82 at a location along the first strip 58 spaced from the molding reference point 54 such that the distance 56 between the receiver point 52 of the bonded bracket 70 and the molding reference 54 point is equal to the predetermined distance 50 between the securing point 46 and the vehicle reference point 48.

In one embodiment, the step of directing material into the molding cavity 140 occurs simultaneously with the step of directing material into the bracket cavity 142. It will be appreciated that this arrangement enables simultaneous formation of the molding 62, formation of the bracket 70, and bonding of the bracket 70. However, it will be appreciated that different arrangements are contemplated by the present disclosure.

In one embodiment, the method further includes the step of releasing the bonded bracket 70 from the bracket apparatus 134. In this embodiment, the step of releasing the bonded bracket 70 may occur after the steps of directing material into the molding cavity 140 and directing material into the bracket cavity 142. Similarly, in one embodiment, the method may further include the steps of removing the molding 62 from the molding cavity 140 and removing the bonded bracket 70 from the bracket cavity 142 (compare FIG. 12 with FIG. 11). In this embodiment, the step of removing the molding 62 may further include the step of removing the first and second strips 58, 60 in unison with the removal of the molding 62 and the step of removing the bonded bracket 70 in unison with the removal of the molding 62. Similarly, in one embodiment, the method further includes the step of removing the molding 62, the first strip 58, and the second strip 60 from the molding apparatus 132, and removing the bonded bracket 70 from the bracket apparatus 134.

In one embodiment, the step of forming the first strip 58 of material includes extruding the first body 82 between the opposing first strip ends 84. Similarly, in one embodiment, the step of forming the second strip 60 of material includes extruding the second body 110 between the opposing second strip ends 112. However, it will be appreciated that the first strip 58 and/or the second strip 60 could be formed in other ways without departing from the scope of the present disclosure.

As is best depicted in FIG. 4, in one embodiment, the step of forming the first strip 58 of material further includes forming the first body 82 between the opposing first strip ends 84 with a profile defined by the base 86 and the first and second arms 88, 90 extending from the base 86. Here, the step of directing material into the bracket cavity 142 may further include forming the interface 74 of the bracket 70 to contact at least a portion of one of the first and second arms 88, 90 of the first body 82 of the first strip 58, and/or at least a portion of the base 86 of the first body 82 of the first strip 58. In one embodiment, the step of directing material into the bracket cavity 142 further includes forming the interface 74 with the base portion 98 to contact the base 86 of the first body 82 of the first strip 58, with the first portion 100 to contact the first arm 88 of the first body 82 of the first strip 58, and/or with the second portion 102 to contact the second arm 90 of the first body 82 of the first strip 58. In one embodiment, the step of directing material into the bracket cavity 142 further includes forming the first portion 100 of the interface 74 to contact the first area 106 of the first arm 88 of the first body 82 of the first strip 58, and forming the second portion 102 of the interface 74 to contact the second area 108 of the second arm 90 of the first body 82 of the first strip 58, with the second area 108 being larger than the first area 106.

Figure 11:
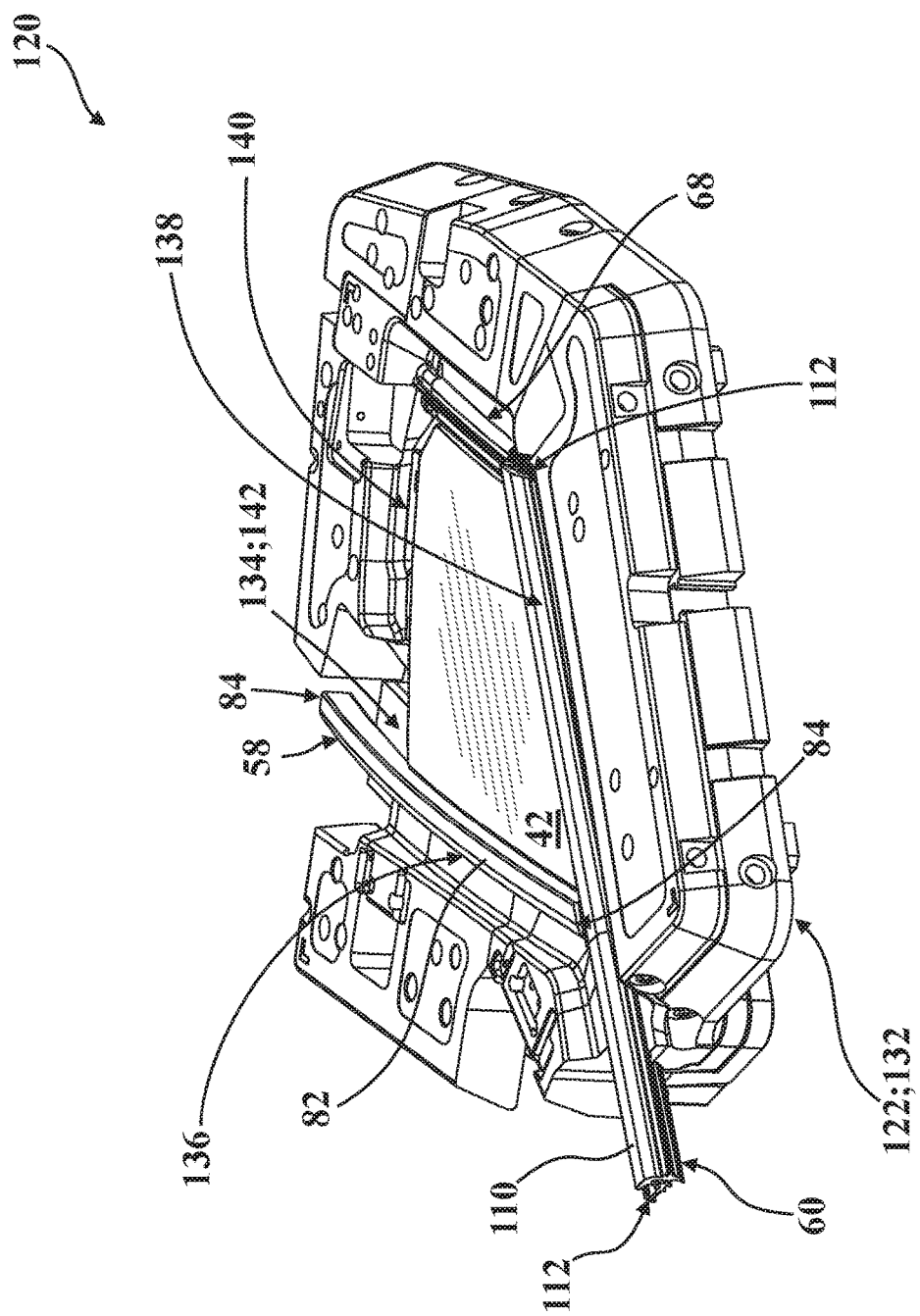
FIG. 11 is another perspective view of the first mold subassembly of FIGS. 8-10, shown with the second body of the window seal assembly disposed in the second receptacle, and with the glass window disposed in the molding cavity.

In one embodiment, the step of directing material into the molding cavity 140 is preceded by the steps of providing the glass window 42 (see FIG. 10), and positioning the glass window 42 into the molding cavity 140 adjacent to the first body 82 and the second body 110 (see FIG. 11). In one embodiment, the step of positioning one of the second strip ends 112 into the second receptacle 138 further includes abutting one of the first strip ends 84 against a portion of the second strip 60 arranged between the opposing second strip ends 112 (see FIG. 11; compare with FIG. 10). In one embodiment, the step of positioning the glass window 42 further includes placing the glass window 42 into contact with at least a portion of at least one of the first body 82 and the second body 110 (see FIG. 11). In one embodiment, the step of directing material into the molding cavity 140 further includes forming the molding 62 in contact with the glass window 42 to bond the glass window 42 to the molding 62, such as by encapsulating the glass window 42 with the molding 62 (see FIG. 12).

Figure 12:
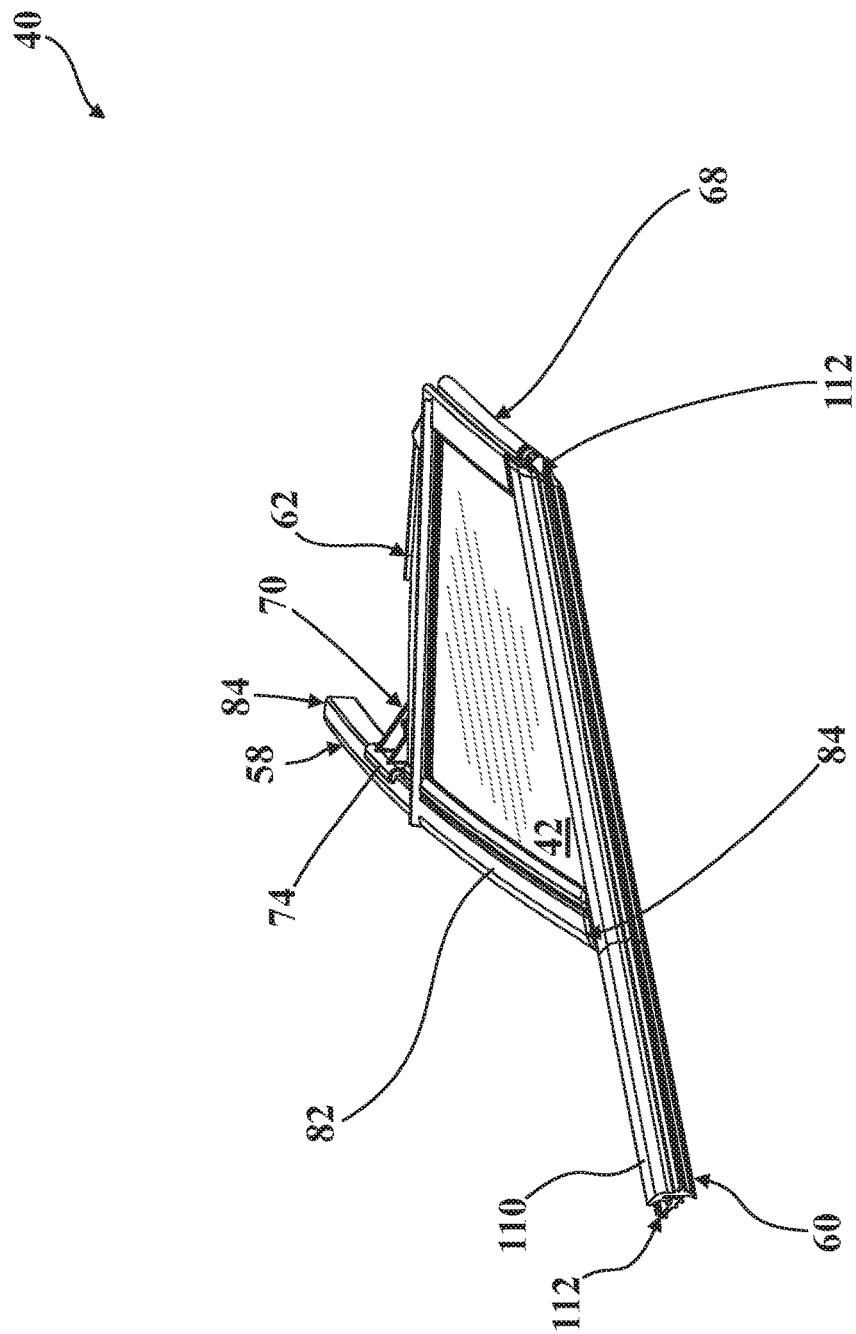
FIG. 12 is another perspective view of the window seal assembly of FIG. 6 formed with the molding apparatus of FIGS. 7-11.

In one embodiment, the step of directing material into the bracket cavity 142 further includes directing material into the bracket cavity 142 at a location outside of the molding cavity 140 such that the bracket 70 is formed in spaced relation with the molding 62 (see FIG. 12). In some embodiments, the method further includes the steps of providing the fastener insert 78 and positioning the fastener insert 78 within the bracket cavity 142 (see FIGS. 14-15). Here, the step of directing material into the bracket cavity 142 may further include forming the receiver 76 of the bracket 70 around the fastener insert 78 to secure the fastener insert 78 to the flange 72 of the bracket 70 at the securing point 46. In other embodiments, the step of directing material into the bracket cavity 142 further includes forming the flange 72 of the bracket 70 around the mold plug body 152 to form the aperture 80 extending through the flange 72 at the securing point 46 with the aperture 80 defining the receiver 76 of the bracket 70 (see FIGS. 18B and 19B).

In this way, the method of the present invention affords significant improvements with respect to maintaining the distance 56 between the receiver point 52 and the molding reference point 54 so as to correspondingly achieve the requisite predetermined distance 50 between the securing point 46 and the vehicle reference point 48 of the vehicle 30 while, at the same time, mitigating tolerance stack-up which could otherwise occur during manufacturing from geometric variations in the various components of the window seal assembly 40. Those having ordinary skill in the art will appreciate that the formation of the bracket 70 with the method of the present invention may advantageously be implanted for applications where the window seal assembly 40 is large, relatively heavy, and/or encapsulates the glass window 42, or where the window seal assembly 40 otherwise needs to be rigidly secured to the vehicle 30

While the invention has been described with reference to the examples above, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all examples falling within the scope of the appended claims.

The invention claimed is:

1. A method of manufacturing a window seal assembly for attachment to a vehicle having a securing point and defining a vehicle reference point spaced from the securing point at a predetermined distance, the method utilizing a molding apparatus having a first receptacle and a second receptacle and defining a molding cavity, and a bracket apparatus defining a bracket cavity, said method comprising the steps of:
   forming a first strip of material to define a first body extending between opposing first strip ends;
   forming a second strip of material to define a second body extending between opposing second strip ends;
   positioning one of the first strip ends of the first strip into the first receptacle with a portion of the first body engaging the bracket apparatus adjacent to the bracket cavity;
   positioning one of the second strip ends of the second strip into the second receptacle;
   directing material into the molding cavity to form a molding bonding the first strip together with the second strip, with the molding defining a molding reference point; and
   directing material into the bracket cavity to form a bracket having a flange with a receiver defining a receiver point and having an interface extending from the flange into contact with the first body to bond the bracket to the first body at a location along the first strip spaced from the molding reference point such that a distance between the receiver point of the bonded bracket and the molding reference point is equal to the predetermined distance between the securing point and the vehicle reference point.

2. The method as set forth in claim 1, wherein the step of forming the first strip of material further includes forming the first body between the opposing first strip ends with a profile defined by a base and first and second arms extending from the base.

3. The method as set forth in claim 2, wherein the step of directing material into the bracket cavity further includes forming the interface to contact at least a portion of at least one of the first and second arms of the first body.

4. The method as set forth in claim 2, wherein the step of directing material into the bracket cavity further includes forming the interface to contact at least a portion of the base of the first body and also to contact at least a portion of each of the first and second arms of the first body.

5. The method as set forth in claim 2, wherein the step of directing material into the bracket cavity further includes forming the interface with a base portion to contact the base of the first body.

6. The method as set forth in claim 5, wherein the step of directing material into the bracket cavity further includes forming the interface with a first portion to contact the first arm of the first body.

7. The method as set forth in claim 6, wherein the step of directing material into the bracket cavity further includes forming the interface with a second portion to contact the second arm of the first body.

8. The method as set forth in claim 7, wherein the step of directing material into the bracket cavity further includes:
   forming the first portion of the interface to contact a first area of the first arm, and
   forming the second portion of the interface to contact a second area of the second arm larger than the first area.

9. The method as set forth in claim 1 further comprising the steps of providing a fastener insert and positioning the fastener insert within the bracket cavity.

10. The method as set forth in claim 9, wherein the step of directing material into the bracket cavity further includes forming the receiver of the bracket around the fastener insert to secure the fastener insert to the flange of the bracket at the securing point.

11. The method as set forth in claim 1, wherein the step of directing material into the bracket cavity further includes forming the flange of the bracket around a mold plug body to form an aperture extending through the flange at the securing point with the aperture defining the receiver.

12. The method as set forth in claim 1, wherein the step of directing material into the molding cavity is preceded by the steps of providing a glass window and positioning the glass window into the molding cavity adjacent to the first body and to the second body.

13. The method as set forth in claim 12, wherein the step of positioning the glass window further includes placing the glass window into contact with at least a portion of at least one of the first body and the second body.

14. The method as set forth in claim 12, wherein the step of directing material into the molding cavity further includes forming the molding in contact with the glass window to bond the glass window to the molding.

15. The method as set forth in claim 14, wherein the step of directing material into the molding cavity includes encapsulating the glass window with the molding.

16. The method as set forth in claim 1, wherein the step of directing material into the bracket cavity further includes directing material into the bracket cavity at a location outside of the molding cavity such that the bracket is formed in spaced relation with the molding.

17. The method as set forth in claim 1, wherein the step of positioning one of the second strip ends into the second receptacle further includes abutting one of the first strip ends against a portion of the second strip arranged between the opposing second strip ends.

18. The method as set forth in claim 1, wherein the step of forming the first strip of material further includes extruding the first body between the opposing first strip ends.

19. The method as set forth in claim 1, wherein the step of forming the second strip of material includes extruding the second body between the opposing second strip ends.

20. The method as set forth in claim 1, wherein the step of directing material into the molding cavity occurs simultaneously with the step of directing material into the bracket cavity.

21. The method as set forth in claim 1, further comprising the step of releasing the bonded bracket from the bracket apparatus.

22. The method as set forth in claim 11, wherein the step of releasing the bonded bracket occurs after the steps of directing material into the molding cavity and directing material into the bracket cavity.

23. The method as set forth in claim 1, further comprising the steps of removing the molding from the molding cavity and removing the bonded bracket from the bracket cavity.

24. The method as set forth in claim 23, wherein the step of removing the molding further includes the step of removing the first and second strips in unison with the removal of the molding.

25. The method as set forth in claim 1, further comprising the step of removing the molding, the first strip, and the second strip from the molding apparatus, and removing the bonded bracket from the bracket apparatus.

\* \* \* \* \*